United States Patent
Shen et al.

(10) Patent No.: US 12,145,620 B1
(45) Date of Patent: Nov. 19, 2024

(54) METHODS AND APPARATUS FOR NETWORK PERFORMANCE-BASED ROUTING OF AUTONOMOUS VEHICLES

(71) Applicant: Nuro, Inc., Mountain View, CA (US)

(72) Inventors: Yichao (Roger) Shen, Mountain View, CA (US); William Paul Maddern, Sunnyvale, CA (US); Xi (Rachel) Wang, Mountain View, CA (US); Vladimir Sliusar, Dublin, CA (US); Mark Rodrigo, Ventura, CA (US); Yu Tong (Julia) Zhang, San Mateo, CA (US)

(73) Assignee: NURO, INC., Mountain View, CA (US)

( * ) Notice: Subject to any disclaimer, the term of this patent is extended or adjusted under 35 U.S.C. 154(b) by 284 days.

(21) Appl. No.: 17/888,393

(22) Filed: Aug. 15, 2022

Related U.S. Application Data

(60) Provisional application No. 63/234,171, filed on Aug. 17, 2021.

(51) Int. Cl.
  *H04W 4/40* (2018.01)
  *B60W 60/00* (2020.01)
  *G01C 21/34* (2006.01)

(52) U.S. Cl.
  CPC ..... *B60W 60/0011* (2020.02); *G01C 21/3461* (2013.01); *H04W 4/40* (2018.02)

(58) Field of Classification Search
  CPC .. B60W 60/0011; H04W 4/40; G01C 21/3461
  See application file for complete search history.

*Primary Examiner* — Mathew Franklin Gordon
(74) *Attorney, Agent, or Firm* — Edell, Shapiro & Finnan, LLC

(57) ABSTRACT

According to one aspect, the routing of an autonomous or semi-autonomous vehicle may be based at least in part upon an ability for a teleoperations system to safely take over the control and operation of the vehicle. A route that is to be driven or traversed by an autonomous vehicle may be created such that geographical areas in which there is substantially inadequate coverage by cellular and/or wireless networks are effectively avoided. By creating routes for an autonomous vehicle that substantially avoid areas of relatively poor cellular and/or wireless network coverage, the ability for the vehicle to safely travel between a source and a destination, even when under the control of a teleoperations system, may be enhanced.

20 Claims, 16 Drawing Sheets

METHODS AND APPARATUS FOR NETWORK PERFORMANCE-BASED ROUTING OF AUTONOMOUS VEHICLES

CROSS REFERENCE TO RELATED APPLICATIONS

This application claims the benefit of Provisional U.S. Application Ser. No. 63/234,171, filed on Aug. 17, 2021, and titled "METHODS AND APPARATUS FOR DYNAMIC ROUTING OF VEHICLES"; the aforementioned priority application being hereby incorporated by reference in its entirety.

TECHNICAL FIELD

The disclosure relates to providing systems for use with autonomous vehicles. More particularly, the invention relates to providing dynamic routing of vehicles based on statuses of service providers or carriers associated with teleoperations systems.

BACKGROUND

Modems which are used to enable communications between an autonomous vehicle and a teleoperations system or endpoint may be associated with different performance levels. In some situations, the performance of a particular modem may be relatively deficient, as for example when a service provider associated with the particular modem has a service outage or otherwise lacks service coverage in a geographical area. When the performance of a particular modem is effectively not up to standards, the ability for a teleoperations system to safely operate an autonomous vehicle may be compromised.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
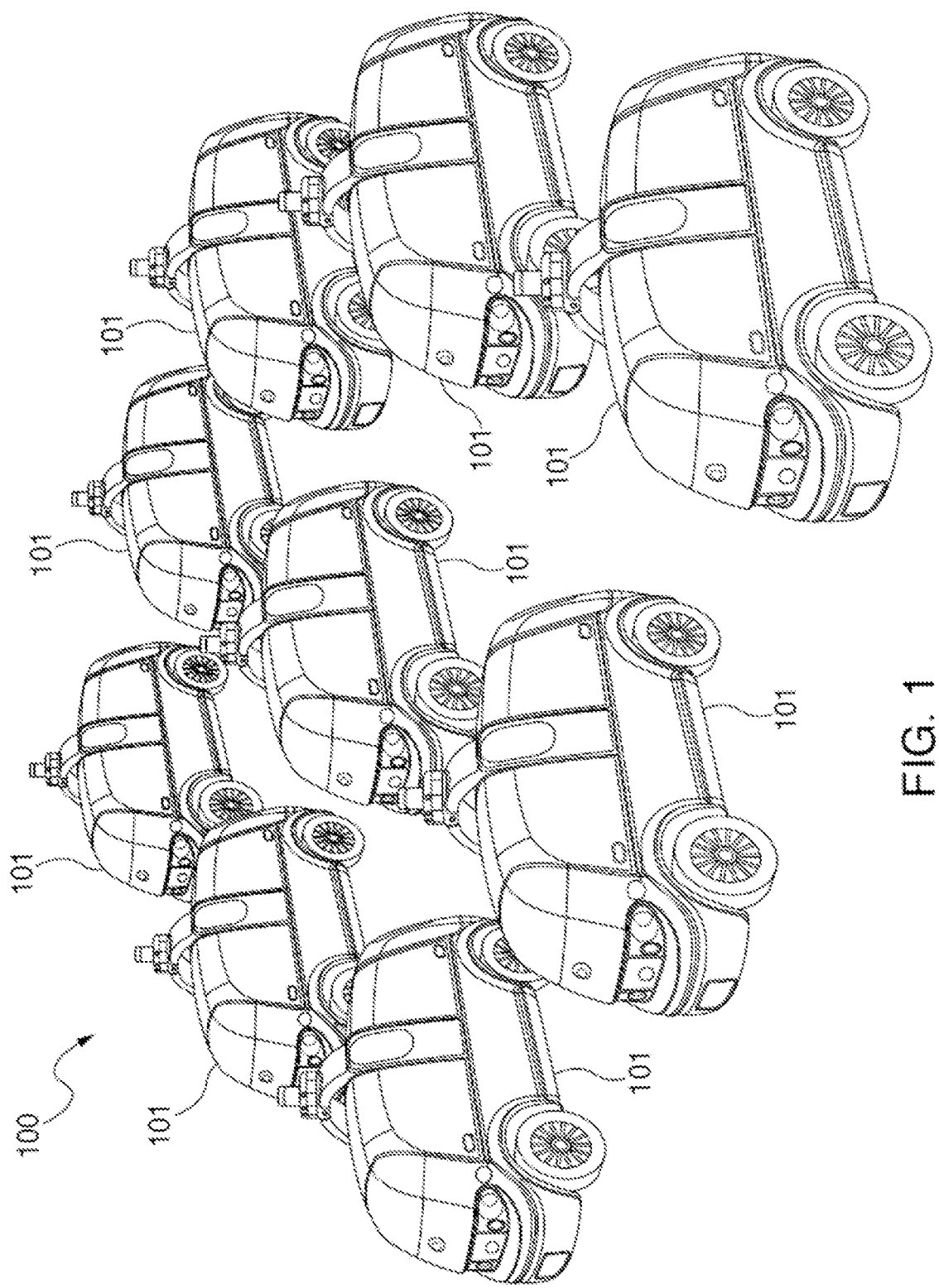
FIG. 1 is a diagrammatic representation of an autonomous vehicle fleet in accordance with an embodiment.

In one embodiment, the routing of an autonomous or semi-autonomous vehicle may be based at least in part upon an ability for a teleoperations system to safely take over the control and operation of the vehicle. A route that is to be driven or traversed by an autonomous vehicle may be created such that geographical areas in which there is substantially inadequate coverage by cellular and/or wireless networks are effectively avoided. By creating routes for an autonomous vehicle that substantially avoid areas of relatively poor cellular and/or wireless network coverage, the ability for the vehicle to safely travel between a source and a destination, even when under the control of a teleoperations system, may be enhanced.

In another embodiment, a computer-implemented method for managing autonomous vehicles comprises maintaining a navigation map of a geographic region, the map data (i) being maintained for operating a fleet of autonomous vehicles within the geographic region and (ii) including a map layer that indicates a set of routing rules for determining routes for the fleet of autonomous vehicles within the geographic region. The method further comprises maintaining a teleoperations coverage map for the geographic region and receiving, from a first vehicle, a first set of network performance data that (i) is generated by the first vehicle while the first vehicle operates within the geographic region and (ii) includes one or more network performance metrics for a first area within the geographic region. The method further comprises updating the teleoperations coverage map based on the first set of network performance data, wherein the updated teleoperations coverage map indicates the first area as being associated with low performance for teleoperations, updating the map layer based on the updated teleoperations coverage map, wherein updating the map layer based on the updated teleoperations coverage map includes updating or generating a routing rule associated with the first area, and determining, based on the navigation map, a route for an autonomous vehicle, the route being determined in accordance with the routing rule associated with the first area.

In a further embodiment, a computing system for managing autonomous vehicles comprises one or more processors and one or more memory resources storing instructions that, when executed by the one or more processors of the computing system, cause the computing system to perform the computer-implemented method described above.

In yet another embodiment, a non-transitory computer-readable medium stores instructions that, when executed by one or more processors of a computing system for managing autonomous vehicles, cause the computing system to perform the compute-implemented method described above.

DESCRIPTION

The use of teleoperations to monitor and/or to remotely control or operate a vehicle, e.g., an autonomous or semi-autonomous vehicle, facilitates the safe operation of the vehicle. This may be particularly relevant for zero-occupant vehicles configured to deliver goods and/or services. For example, teleoperations systems may be used to remotely monitor an autonomous vehicle that is operating autonomously or semi-autonomously and a teleoperations operator may remotely control the vehicle or issue commands when the autonomous vehicle is unable to operate safely without intervention. Thus, teleoperations monitoring and/or control of vehicles substantially ensure that the vehicle may operate safely and may provide or increase a level of assurance and safety associated with operating such vehicles on public roads.

The overall quality associated with a teleoperations system may be dependent upon factors including, but not limited to including, the quality of one or more service providers or wireless carriers that stream data, e.g., sensor data, associated with a vehicle. While an autonomous vehicle is being remotely operated using a teleoperations system, the performance of a cellular and/or wireless network may fluctuate due at least in part to a change in the signal strength of a wireless signal. In some geographical areas, a degradation of signal strength may render an overall network condition to be inadequate for the safe operation of the autonomous vehicle. When one or more service providers is substantially characterized by relatively poor coverage or quality in a particular geographic area, region, or location, the safety with which an autonomous vehicle may operate in that area or location may be compromised.

According to embodiments, a fleet of autonomous vehicles may operate within a geographic region to, for example, deliver goods, provide services, or fulfill transportation requests. In addition, or as an alternative, vehicles such as test or validation vehicles may operate within the geographic region to test or validate vehicle hardware and/or software (e.g., autonomy hardware and software) within the geographic region. These vehicles may each be equipped with communications equipment, such as cellular and/or satellite modems, to establish and maintain data communications via one or more network service providers (e.g., cellular service providers, satellite communications service providers, etc.). The fleet of autonomous vehicles and/or other vehicles such as test vehicles may be configured to monitor network performance as they operate and navigate within the geographic region and generate network performance data. The network performance data may include metrics such as packet loss rate, bandwidth, latency, round-trip time (RTT), wireless signal strength, and the like.

According to embodiments, network performance data from a plurality of vehicles and over time may be received, aggregated, and analyzed by one or more computing systems or devices (e.g., a server computer) to identify or determine areas of low performance (e.g., "dead zones") where data communications may not perform sufficiently well to or may not be reliable to support, for example, teleoperations monitoring and/or control of autonomous vehicles. In particular, the one or more computing systems may generate, maintain, and/or update a teleoperations coverage map of the geographic region. The areas of low or poor performance may be marked or identified by the teleoperations coverage map and, in addition, a visual rendering of the teleoperations coverage map (e.g., as a visual layer on top of a map display) may be generated to help operators and system administrators to visualize areas within the geographic region that may not be suitable for autonomous vehicle operations.

In one embodiment, information relating to the current and/or recent cellular and/or wireless network coverage may be monitored and used to effectively mark certain geographical areas as "dead zones" or zones to be avoided when routing an autonomous vehicle. The information relating to areas of low performance such as the teleoperations coverage map generated by the one or more computing systems may be used to determine or affect operations the fleet of autonomous vehicles. In one aspect such information may be integrated into map data (e.g., navigation maps, context maps, etc.) to modify the routing of the fleet of autonomous vehicles and/or to determine the areas of the geographic region in which the fleet of autonomous vehicles may operate (e.g., to ensure the availability teleoperations monitoring and/or control). For instance, a data layer (e.g., a routing rules map layer) within the map data (e.g., navigation map) of the geographic region may be generated, maintained, and updated to specify routing rules and/or constraints for the fleet of autonomous vehicles within the geographic region. The data layer specifying routing rules and/or constraints may be updated based on the teleoperations coverage map. For example, the data layer may be generated or updated to include geofences and/or route prohibitions that prevent generation of routes for the fleet of autonomous vehicles that traverse areas of low-quality network performance. By routing an autonomous vehicle to substantially avoid geographical areas or locations which have relatively poor cellular and/or wireless network coverage, the likelihood that a teleoperations system may be able to safely monitor and/or control the autonomous vehicle may be increased. When an autonomous vehicle is routed such that zones with relatively poor cellular and/or wireless network coverage are substantially avoided, the likelihood that the autonomous vehicle operates safely operate may be enhanced.

An autonomous or semi-autonomous vehicle which may be routed such that areas or locations with insufficient cellular or network coverage are substantially avoided may be part of a vehicle fleet. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
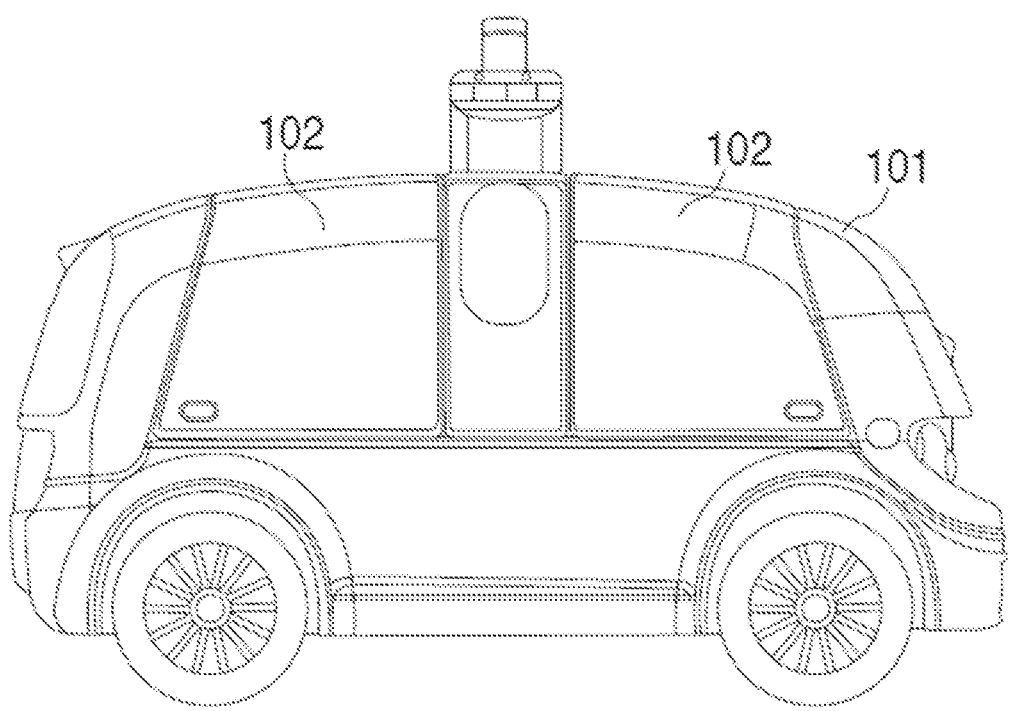
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
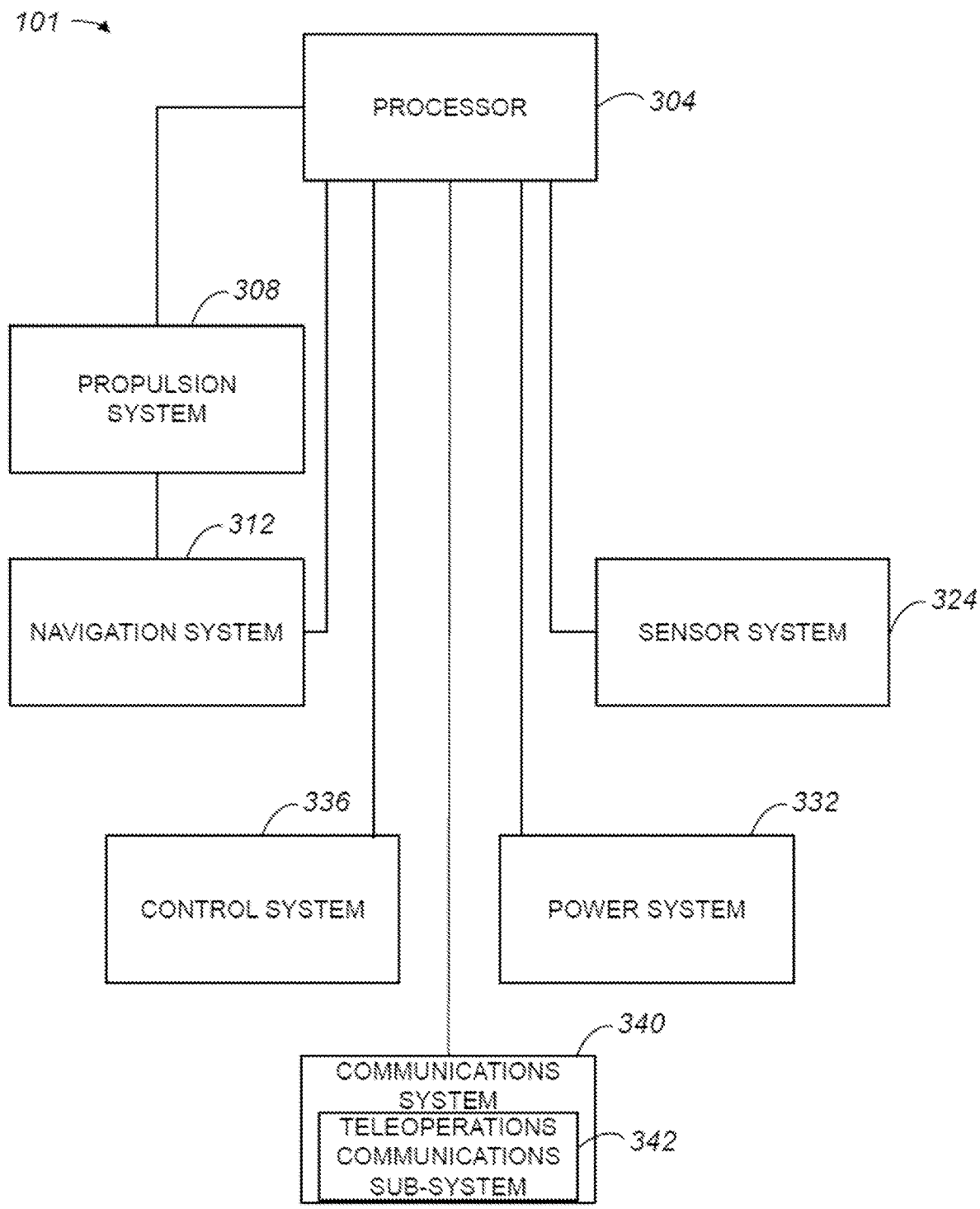
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely through teleoperations. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand. In one embodiment, communications system 340 includes a teleoperations communications sub-system 342. Teleoperations communications sub-system 342 may include multiple modems, e.g., cellular modems such as LTE or 3G/4G/5G modems, that are arranged to cooperate to communicate with a fleet operations system (not shown) such that a teleoperations system of the fleet operations system may monitor and operate autonomous vehicle 101 remotely. It should be appreciated that teleoperations communications sub-system 342 may alternatively, or additionally, communicate substantially directly with a teleoperations system (not shown).

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4A:
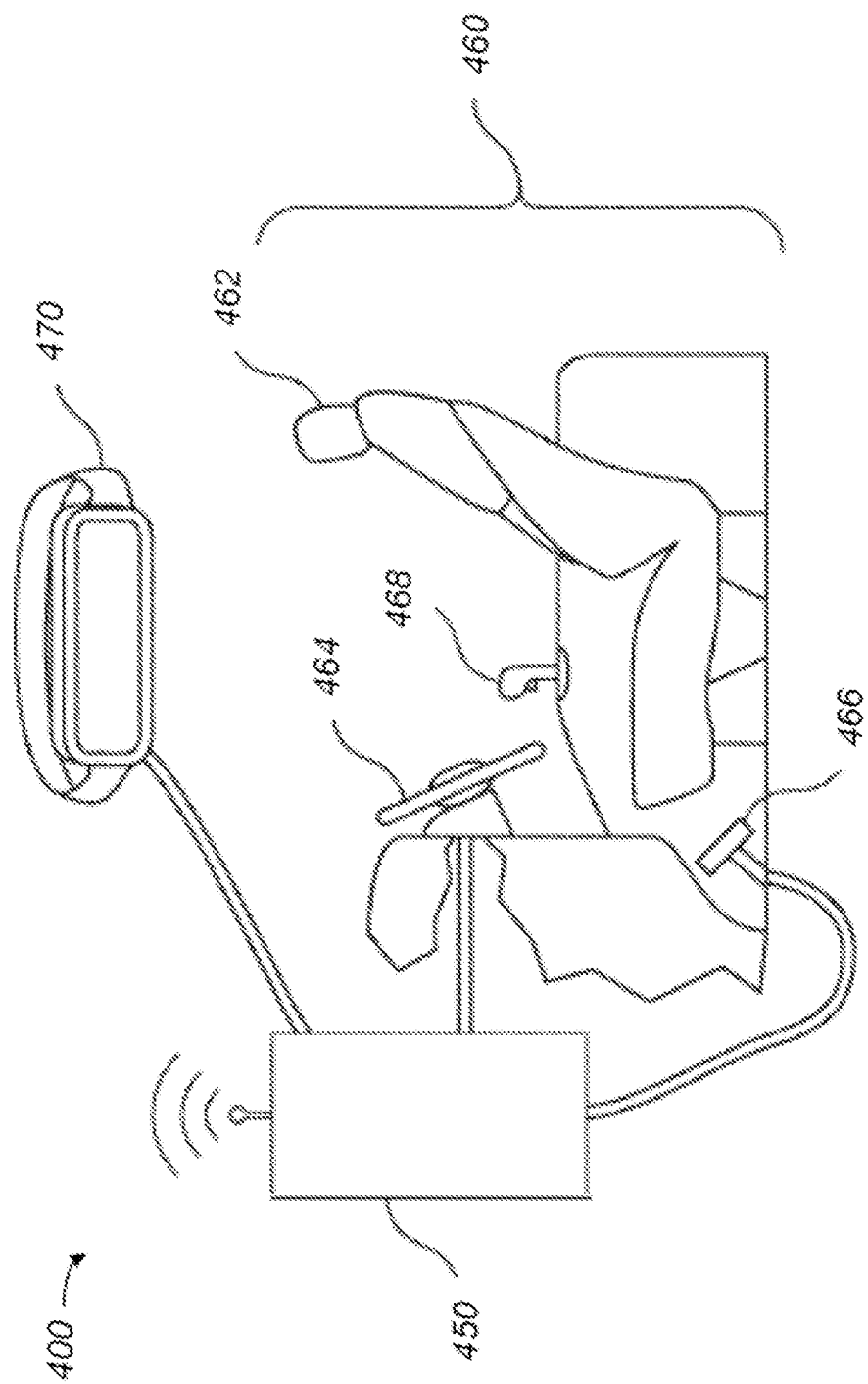
FIG. 4A is a remote human operator system suitable for use in remotely operating a vehicle, e.g., an autonomous vehicle, in accordance with an embodiment.

To enhance the ability of a remote human operator, e.g., a teleoperator, information or data may be provided to a teleoperations system to provide the remote human operator with context associated with an environment in which an autonomous vehicle is operating. The information provided may include, but is not limited to including, images such as still and video images of the surroundings of the autonomous vehicle and/or sounds emanating from the surroundings of the autonomous vehicle. FIG. 4A is a remote human operator system suitable for use in remotely operating a vehicle, e.g., an autonomous vehicle, in accordance with an embodiment. A system 400, which may be a teleoperations system, includes communication/processing equipment 450 and a human operator station 460. The teleoperations system may be part of a fleet management system. Human operator station 460 may resemble, in one embodiment, a driver station in a typical automobile, and may include a driver seat 462, a steering wheel 464, acceleration and brake pedals 466, and a gear shifter 468. Human operator station 460 also includes a visual interface 470 that is configured to allow a human operator to view the environment in which an autonomous vehicle that is to be driven or otherwise controlled by human operator station 460 is driving.

In one embodiment, visual interface 470 is in the form of a virtual-reality (VR) or augmented-reality (AR) headset. Visual interface 470 is not limited, however, to being a VR or an AR headset. By way of example, visual interface 470 may include one or more display screens. Display screens may be LED, LCD, and/or OLED display screens. Visual interface 470 may be configured to provide any number of different views of the environment in which the autonomous vehicle is driving. Such views may include, but are not limited to including, front views, side views, and/or rear views.

Human operator station 460 may be configured to have the approximate touch response of an actual driver station in an automobile. For example, steering wheel 464 may be configured to have a touch response that is similar to that of power steering in an actual automobile, and pedals 466 may be configured to approximate the resistance of pedals in an actual automobile.

Steering wheel 464, acceleration and brake pedals 466, and gear shifter 468 may be connected to or otherwise coupled to communication/processing equipment 450. Communication/processing equipment 450 enables communication between human operator station 460 and the autonomous vehicle that is configured to be remotely operated using human operator station 460. As shown, human operator station 460 may be connected to communication/processing equipment 450 by physical cables and connections. It should be appreciated, however, that human operator station 460 may instead be wirelessly coupled to communication/processing equipment 450 using any suitable method including, but not limited to including, Bluetooth and Wi-Fi. In addition, while human operator station 460 may be substantially directly connected to communication/processing equipment 450, human operator station 460 may instead be coupled to communication/processing equipment 450 through intermediate devices and/or networks, e.g., wireless and/or cellular networks.

Communication/processing equipment 450 may establish communications, as for example communications with an autonomous vehicle and/or with visual interface 470, using various communications technologies including, but not limited to including, IEEE 802.11x (Wi-Fi), cellular 3G/4G/5G, cellular LTE, wired communications, and/or other wired or wireless communication protocols. It should be appreciated that communication/processing equipment 450 generally includes one or more processors, memories, machine instructions, and/or hardware for processing visual information for display by the visual interface 470. Substantially any suitable method may be used to communicate, to process, and to display visual information.

Communication/processing equipment 450 is generally arranged to process signals from human operator station 460, and to translate the signals into control instructions for controlling an autonomous vehicle. In one embodiment, communication/processing equipment 450 is arranged to provide teleoperations capabilities. The signals provided by communication/processing equipment 450 may include control instructions for controlling a conveyance system of the autonomous vehicle to cause the autonomous vehicle to drive or to otherwise travel.

When a human operator turns or steers steering wheel 464, communication/processing equipment 450 may send corresponding control instructions to an autonomous vehicle to instruct the autonomous vehicle to turn or to drive in the direction indicated by the way the human operator steers steering wheel 464. In addition, when a human operator accelerates or brakes using pedals 466 of operator station 460, communication/processing equipment 450 sends corresponding control instructions to the autonomous vehicle to instruct the autonomous vehicle to accelerate or brake, respectively.

Figure 4B:
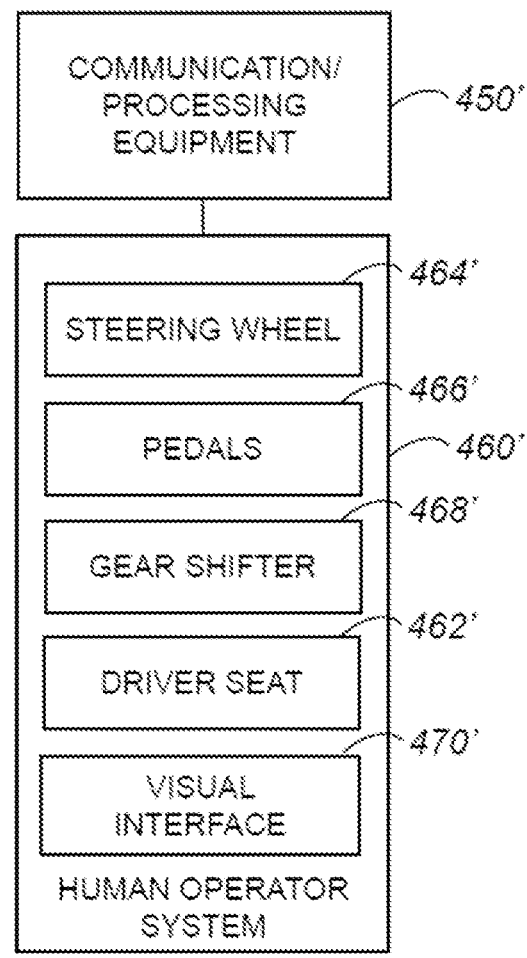
FIG. 4B is a block diagram representation of a remote human operator system, e.g., remote human operator system 400 of FIG. 4A, in accordance with an embodiment.

FIG. 4B is a block diagram representation of one embodiment of operator system 400. As shown in FIG. 4B, operator system 400' may include communication/processing equipment 450' and human operator system 460' which are in communication with each other. Communication/processing equipment 450' may be arranged to receive or to otherwise obtain signals from a vehicle over multiple channels, and to substantially create a composite signal from the signals, e.g., to effectively reconstruct a frame after portions of the frame are obtained from the multiple channels. Communication/processing equipment 450' may also send or otherwise provide signals to a vehicle using the same channels used to receive signals form the vehicle.

Human operator system 460' generally includes controls and other equipment which enable a remote human to drive or to otherwise control a vehicle. Human operator system 460' includes driver seat 462', steering wheel 464', pedals 466', gear shifter 468', and visual interface 470'. Pedals 466' may include an accelerator pedal, e.g., a gas pedal, and a brake. Visual interface 470' may, in one embodiment, include at least one display screen arranged to display images which substantially depict the environment around a vehicle controlled using operator system 400'.

Figure 5:
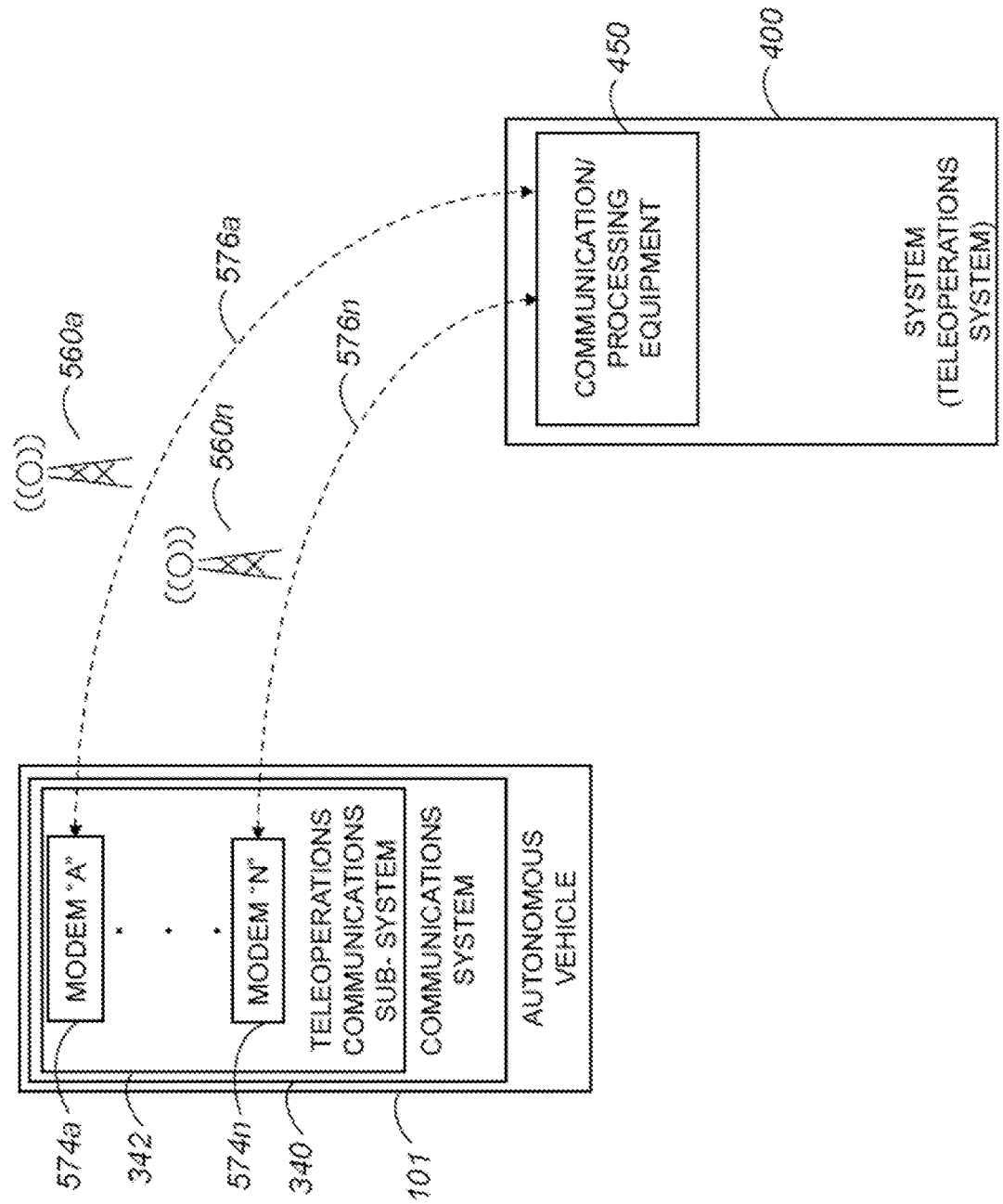
FIG. 5 is a diagrammatic representation of communications between a communications system of an autonomous vehicle, e.g., communications system 340 of FIG. 3, and a system such as a teleoperations system, e.g., system 400 of FIGS. 4A and 4B, in accordance with an embodiment.

FIG. 5 is a diagrammatic representation of communications between a communications system of an autonomous vehicle, e.g., communications system 340 of FIG. 3, and a system such as a teleoperations system, e.g., system 400 of FIGS. 4A and 4B, in accordance with an embodiment. Communications system 340 generally includes multiple cellular modems 574a-n Modems 574a-n are generally devices that provide cellular connectivity to an autonomous vehicle, e.g., autonomous vehicle 101 of FIGS. 1-3. In one embodiment, modems 574a-n may provide 3G/4G/5G or LTE cellular connectivity, although it should be appreciated that other types of connectivity may instead or additionally be provided by modems 574a-n. Modems 574a-n may be configured in any suitable form including, but not limited to including, universal serial bus (USB) modules and/or peripheral interconnect (PCI) cards. Further, the number of modems 574a-n included in communications system 340 may vary widely. In general, communications system 340 includes two or more modems 574a-n, each of which may be associated with a different cellular provider or carrier 560a-n, respectively. Each modem 574a-n is associated with one or more channels 576a-n, respectively, over which data may be transmitted and received. That is, teleoperations communications sub-system 340 generally communicates with communication/processing equipment 450 through communications 576a-n supported by modems 574a-n, respectively. As mentioned above, in one embodiment, communications system 340 may include approximately four modems 547a-n, and each of the four modems 547a-n may be associated one channel.

Figure 6:
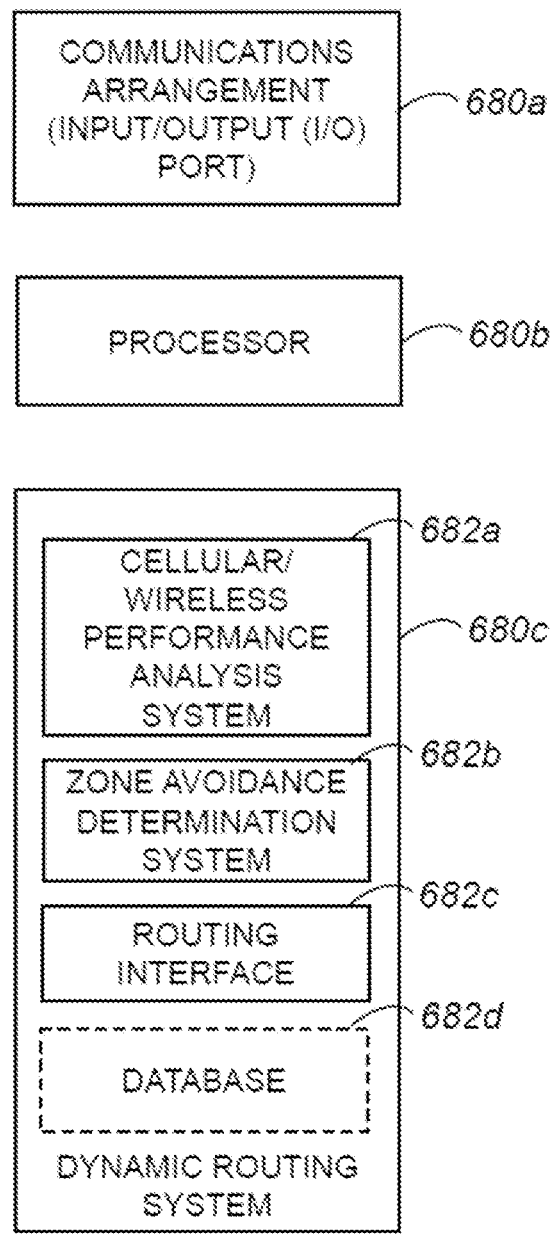
FIG. 6 is a block diagram representation of a system configured to use information associated with a performance of a cellular and/or wireless network to route an autonomous vehicle in accordance with an embodiment.

FIG. 6 is a block diagram representation of a system configured to use information associated with a performance of a cellular and/or wireless network to route an autonomous vehicle in accordance with an embodiment. A system 680 is configured to facilitate generating or otherwise creating a route between a source and a destination for an autonomous vehicle such that areas of inadequate cellular and/or wireless network performance may be avoided. System 680 may be located on an autonomous vehicle, or may be remote with respect to an autonomous vehicle, e.g., located on a computing system associated with an enterprise or a fleet management system.

System 680 includes a communications arrangement 680a, a processor 680b, and a dynamic routing system 680c. Communications arrangement 680a may generally support the acquisition of, and the distribution of, information by system 680. In one embodiment, communications arrangement 680a may include at least one input/output (I/O) port which may support wired and/or wireless communications.

Dynamic routing system 680c may include hardware and/or software logic configured to support the generation or identification of a suitable route or path along which an autonomous vehicle such as autonomous vehicle 101 of FIGS. 2 and 3 may be routed. Processor 780b is configured to execute software logic or code devices of dynamic routing system 680c.

Dynamic routing system 680c includes a cellular and/or wireless performance analysis system 682a, a zone avoidance determination system 682b, a routing interface 682c, and an optional database 682d. Cellular and/or wireless performance analysis system 682a is configured to process information obtained through communications arrangement 680a and/or optional database 682d. The information processed may include, but is not limited to including, statistics associated with at least one cellular and/or wireless network such as a data transmission rate, a latency, a loss rate, and/or a signal strength. Cellular and/or wireless performance analysis system 682a may create and/or update a statistical model or algorithm which effectively determines whether geographic areas or zones associated with each cellular and/or wireless network are performing at least to a threshold level.

Zone avoidance determination system 682b may process results obtained from cellular and/or wireless performance analysis system to ascertain whether a geographic area or zone associated with each applicable cellular and/or wireless network may effectively support transmissions, e.g., transmission of sensor data from an autonomous vehicle to a teleoperations system, that enable an autonomous vehicle to operate safely while under the control or a teleoperator operating a teleoperations system. In one embodiment, zone avoidance determination system 682b may identify boundaries associated with a geographical area or zone which are to be avoided when a route is being created form an autonomous vehicle.

Routing interface 682c is generally configured to provide an output from zone avoidance determination system 682b to a routing system (not shown) and/or a mapping system (not shown), as for example using communications arrangement 680a, to enable a route for an autonomous vehicle to be determined that substantially avoids geographical areas or zones which have relatively low performing cellular and/or wireless networks. In one embodiment, routing interface 682c may be configured to calculate a route for an autonomous vehicle.

Optional database or data store 682d may be arranged to store statistics or other information associated with cellular and/or wireless networks at different geographical areas or zones. Optional database 682d may also store information relating to geographical areas or zones which are to be avoided when creating a path for an autonomous vehicle, e.g., due to cellular and/or wireless networks that do not meet desired performance standards.

Dynamic routing system 680c may include mapping functionality which is configured to render a map with an overlay arranged to substantially identify an area to be avoided when generating a route. Such a map may provide a visual representation of an area that is to be avoided.

In general, the identification of areas or zones that are to be substantially avoided when generating a route to be traversed by an autonomous vehicle may occur dynamically, as for example as such areas or zones are identified or detected. Once an area or zone is identified as not meeting network performance standards, the area or zone may remain marked as an area or zone that is to be avoided until a subsequent analysis identifies the area or zone as meeting network performance standards. In one embodiment, the performance of areas or zones may be periodically reevaluated.

Figure 7:
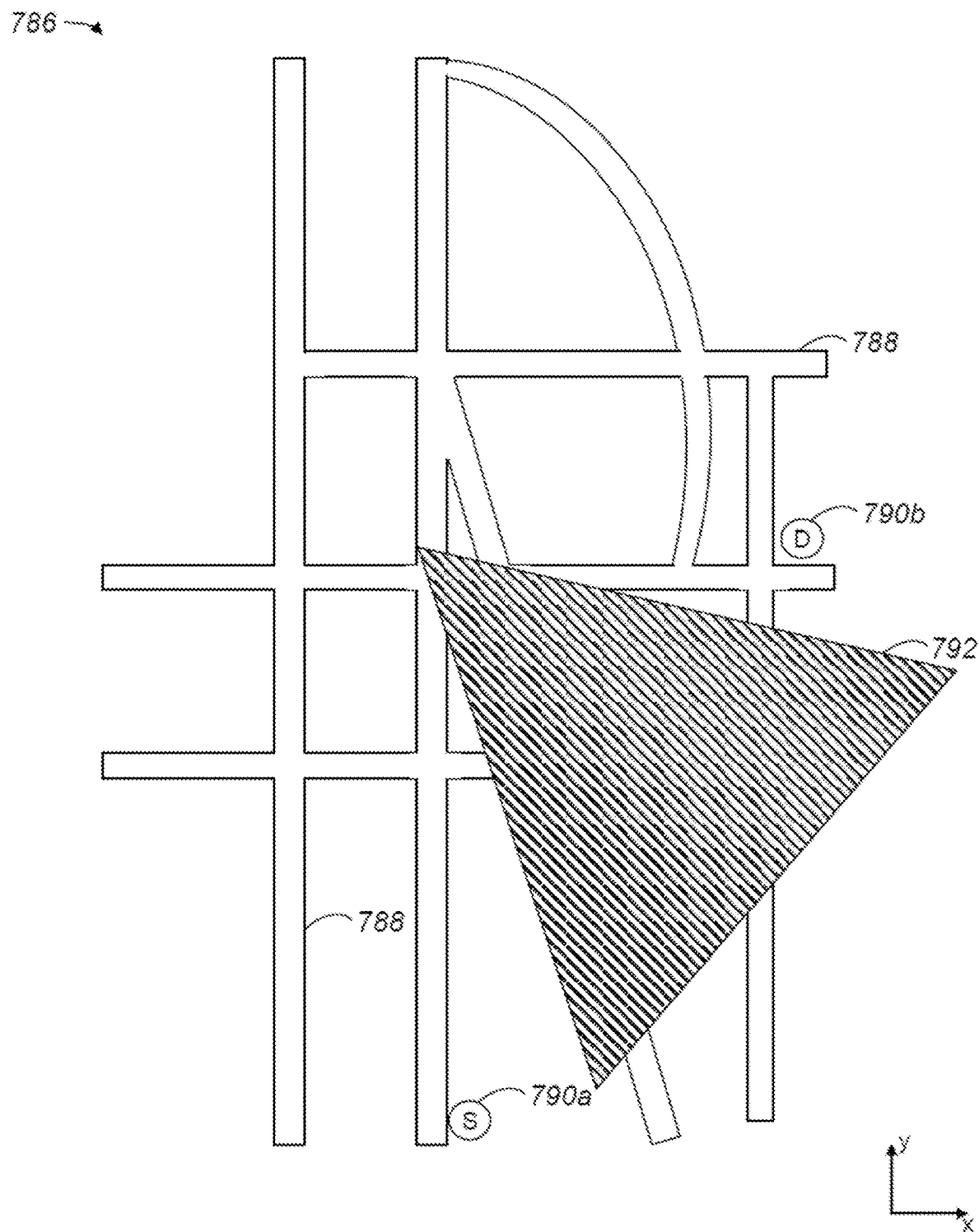
FIG. 7 is a diagrammatic representation of a portion of a map in which a geographical area is identified as having inadequate cellular and/or wireless network service in accordance with an embodiment.

FIG. 7 is a diagrammatic representation of a portion of a map in which a geographic area is identified as having inadequate cellular and/or wireless network service in accordance with an embodiment. A map 786 generally includes roadways 788, e.g., streets, which may intersect. As shown, map 786 includes a dead zone 792, or a geographical area or zone that is to be avoided, when routing a path between a source or starting point 790*a* and a destination or ending point 790*b*.

In one embodiment, dead zone 792 indicates an area in which cellular and/or wireless network performance or service does not meet standards. The standards may vary widely. In generally, the standards may be a substantially minimum performance or service level that is considered to be adequate to substantially ensure that an autonomous vehicle may operate safely under the control of a remote operator using a teleoperations system. Information relating to dead zone 792 may be provided to a routing system such that the routing system is aware that dead zone 792 is to be avoided when creating a route from source 790*a* to destination 790*b*.

Figure 8:
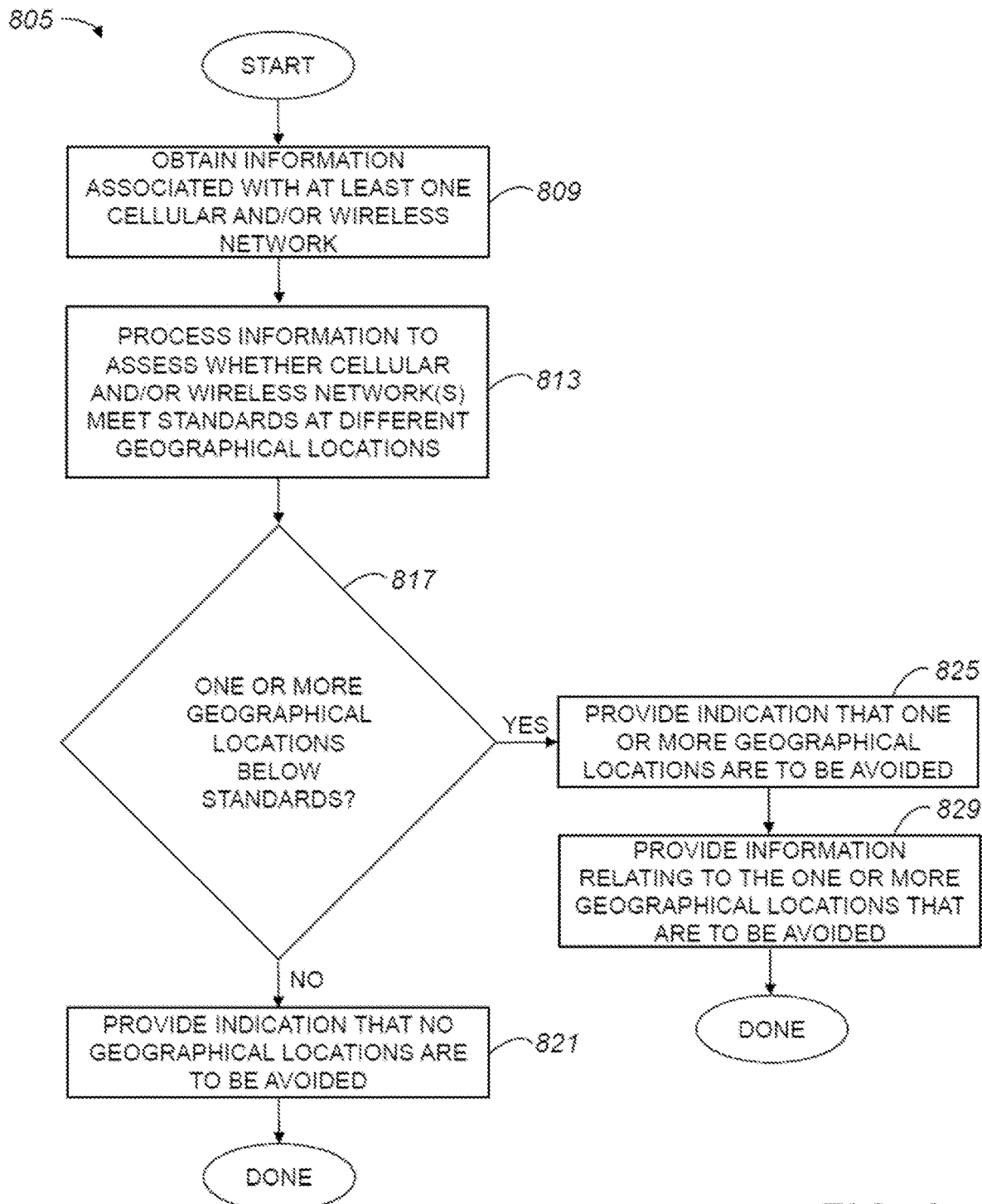
FIG. 8 is a process flow diagram which illustrates a method of identifying a geographical area as having inadequate cellular and/or wireless network service in accordance with an embodiment.

Referring next to FIG. 8, a method of identifying a geographic area as having inadequate cellular and/or wireless network performance or service will be described in accordance with an embodiment. A method 805 of identifying a geographic area as having a lower than desired level of cellular and/or wireless network performance begins at a step 809 in which information associated with at least one cellular and/or wireless network is obtained. The information may be obtained from any suitable source, e.g., from one or more modems, and may include, but is not limited to including, a data rate associated with the network, a latency associated with the network, a loss rate associated with the network, and/or a signal strength associated with the network. It should be appreciated that the information may be obtained and processed dynamically, e.g., substantially in real time, or the information may be historical information that may be obtained from a data store.

In a step 813, the information is processed to assess whether cellular and/or wireless networks meet standards at different geographical locations or regions. Processing the information may include, but is not limited to including, building a statistical model and/or ascertaining whether the information identifies locations or regions with performance below desired standards.

A determination is made in a step 817 as to whether there are one or more geographical locations that essentially fall below performance standards. If the determination is that one or more geographical locations do fall below performance standards, process flow proceeds to a step 821 in which an indication is provided, e.g., to a routing system, that there are effectively no geographical locations which are to be avoided due to network performance standards, and the method of identifying a geographic area as having a lower than desired level of cellular and/or wireless network performance is completed.

Alternatively, if the determination in step 817 is that there are one or more geographical locations with network performance or service that falls below standards, then in a step 825, an indication is provided that one or more geographical locations are to be avoided. After the indication is provided, as for example to a routing system, information relating to the one or more geographical locations to be avoided is provided in a step 829. The information provided may enable a routing system to effectively black-out or label areas as dead zones, or zones to be avoided when generating a route for an autonomous vehicle to traverse between a source and a destination. Once the information relating to the one or more geographical locations is provided, the method of identifying a geographic area as having a lower than desired level of cellular and/or wireless network performance is completed.

Figure 9:
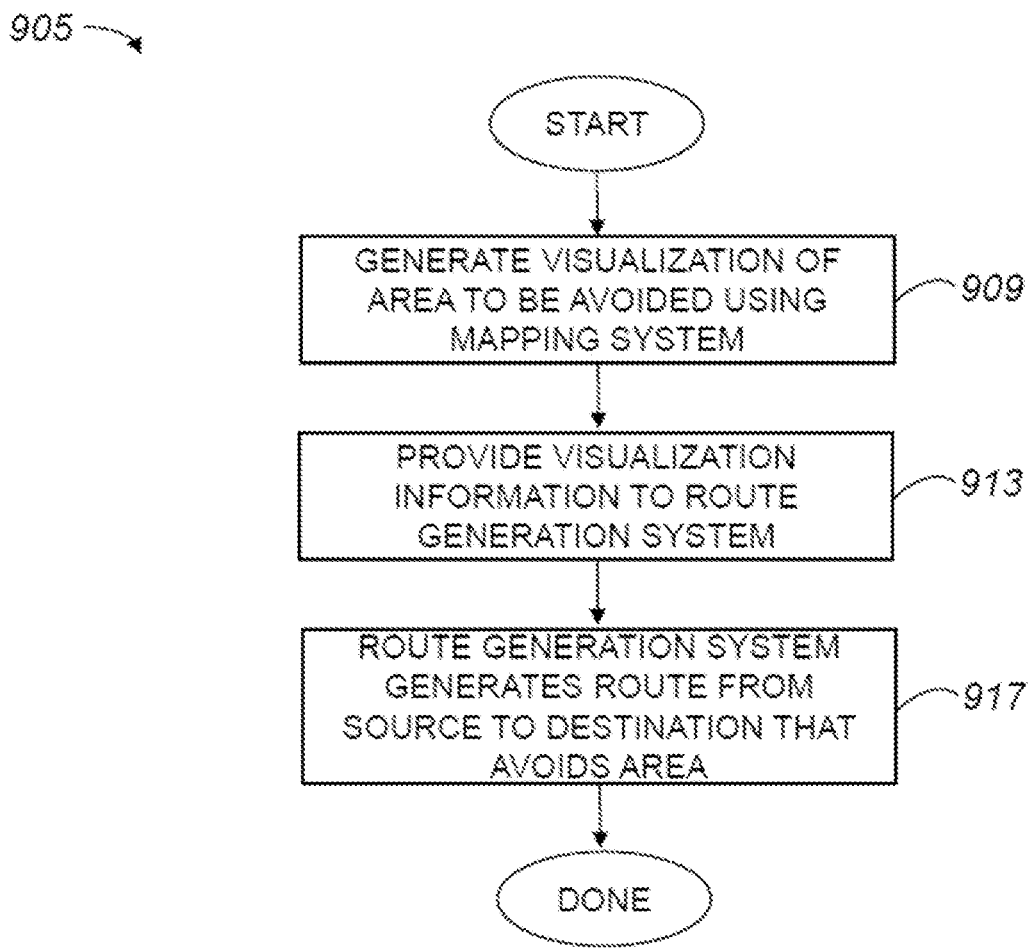
FIG. 9 is a process flow diagram which illustrates a method of substantially preventing a mapping system or a routing system from creating a route that includes a geographical area which has inadequate cellular and/or wireless network service in accordance with an embodiment.

FIG. 9 is a process flow diagram which illustrates a method of substantially preventing a routing or mapping system from creating a route that includes a geographical area which has inadequate cellular and/or wireless network service in accordance with an embodiment. A method 905 of creating a route that does not include an identified dead zone begins at a step 909 in which a visualization of an area to be avoided may be generated using a mapping system. In one embodiment, a rendering of a dead zone may effectively be overlayed on a rendering of a map generated by a mapping system.

In a step 913, the visualization of the area to be avoided may be provided to a routing system or a route generation system. The routing system may use information about the area to be avoided to facilitate an identification of a suitable route that generally does not include areas in which the performance or a cellular and/or wireless network does not meet standards.

After the visualization information is provided to a route generation system, the route generation system generates a route in a step 917 that avoids the area in which the performance of a cellular and/or wireless network does not meet standards. Once the route is generated, the method of creating a route that does not include an identified dead zone is completed.

Figure 10:
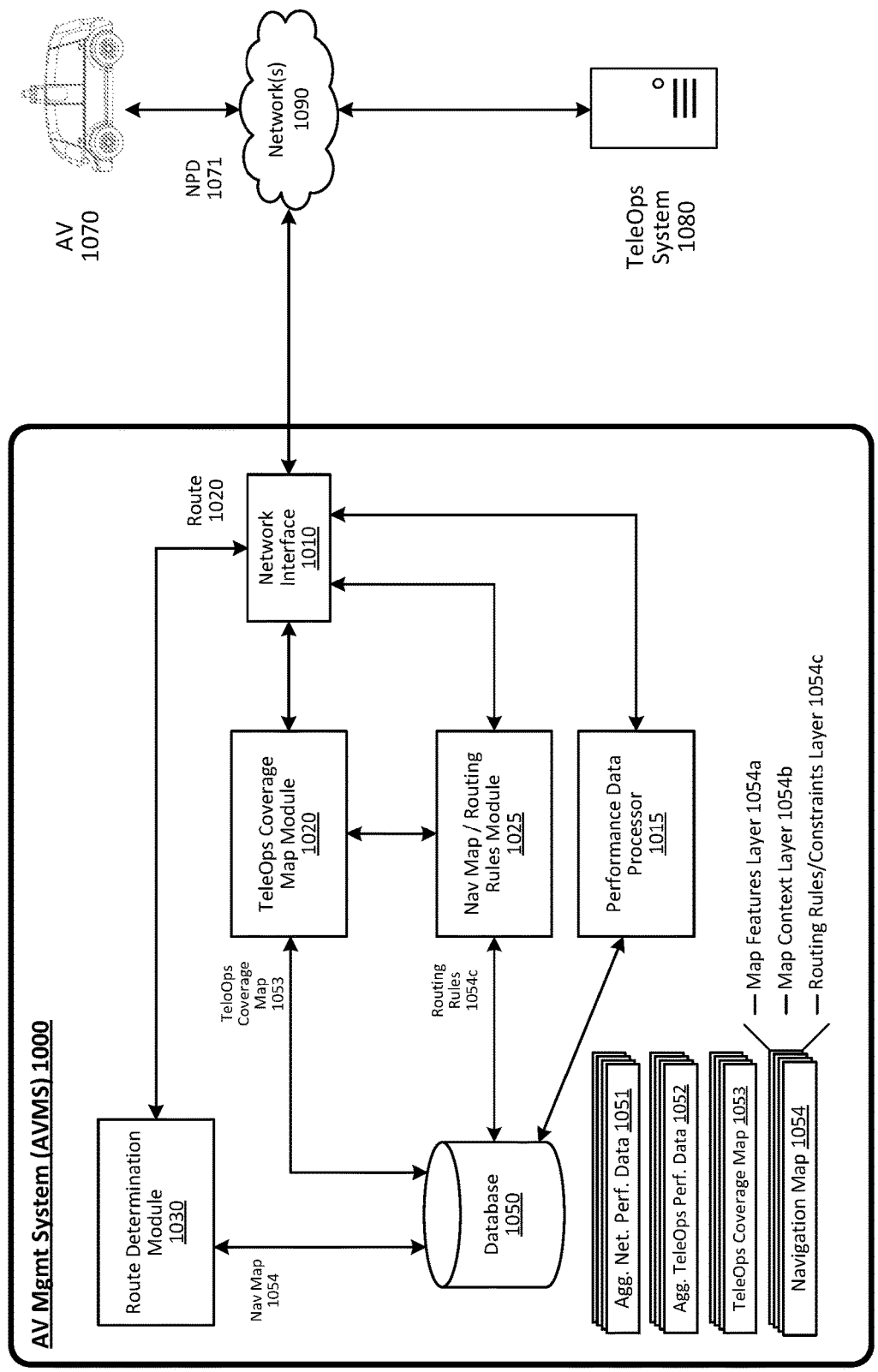
FIG. 10 is a block diagram of an autonomous vehicle management system configured to manage a fleet of autonomous vehicles, in accordance with embodiments.

FIG. 10 is a block diagram of an autonomous vehicle management system configured to manage a fleet of autonomous vehicles, in accordance with embodiments. The autonomous vehicle management (AVMS) 1000 illustrated in FIG. 10 may be configured to communicate with and manage the operation of a fleet of autonomous vehicles, such as the vehicles 101 illustrated in the prior figures.

According to embodiments, the AVMS 1000 includes a network interface 1010, a teleoperations coverage map module 1020, a navigation map and/or routing rules module 1025, a route determination module, and a database 1050. The AVMS 1000 may communicate, via the network interface 1010 over a network 1090, with a fleet of autonomous vehicles and a teleoperations computing system 1080. The network 1090 may be a public data network such as the Internet, a private network, or a virtual private network (VPN) established over a public network. The teleoperations computing system 1080 may refer to a teleoperations server and/or one or more teleoperations human interface consoles used by teleoperations operators.

According to embodiments, the performance data process 1015 may be configured to receive network performance data 1071 from vehicles and teleoperations performance data 1081 from the teleoperations computing system 1080. In particular, the received performance data may be aggregated by the AVMS 1000 and stored in the database 1050 as aggregated network performance data 1051 and aggregated teleoperations performance data 1052.

The teleoperations coverage map update module 1020 may be configured to generate and/or update a teleoperations coverage map 1053 based on the aggregated network performance data 1051 and/or the aggregated teleoperations performance data 1052. In particular, the teleoperations coverage map module 1020 may identify one or more map tiles within a map of a geographic region as "teleoperations dead zones" or "dead zones" (e.g., areas designated as having low performance for teleoperations") based on the aggregated network performance data 1051 and/or the aggregated teleoperations performance data 1052.

According to embodiments, the navigation map and routing rules module 1025 may generate routing rules based on the teleoperations coverage map 1053. In one aspect, the routing rules may include geofences, routing constraints or prohibitions relating to the areas or map tiles that are designated as having low performance for teleoperations.

The database 1050 may further maintain a navigation map 1054, which may include a map features layer 1054*a*, a context layer 1054*b*, and the routing rules map layer 1054*c*. The navigation map 1054 may be used by the route determination module to generate routes 1020 for vehicles of the autonomous vehicle fleet managed by the AVMS.

Figure 11:
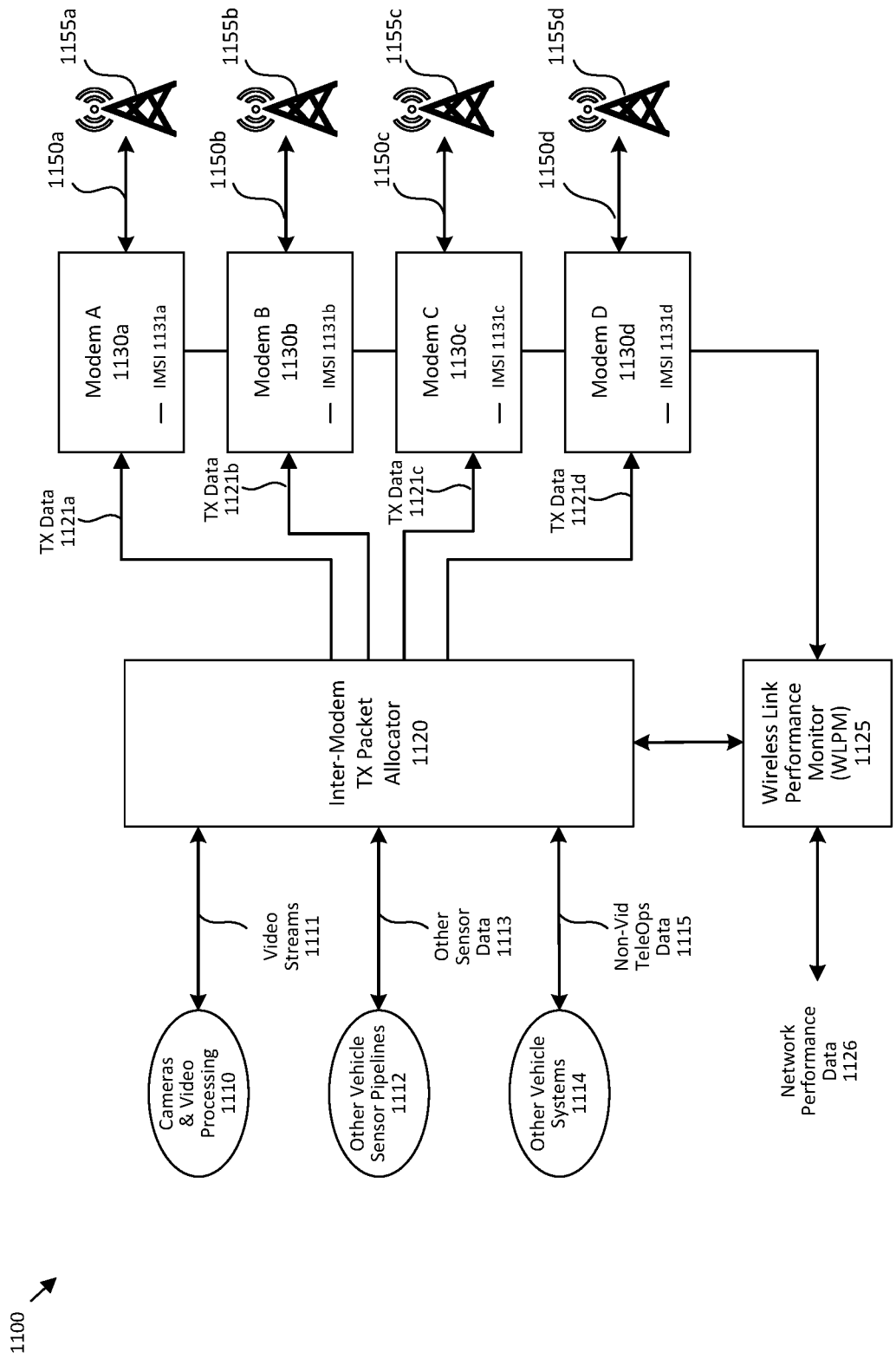
FIG. 11 is a block diagram of a portion of an example autonomous vehicle, such as communication components, in accordance with embodiments.

FIG. 11 is a block diagram of a portion of an example autonomous vehicle, such as communication components, in accordance with embodiments. Referring to prior figures, the vehicle 1100 illustrated in FIG. 11 may be an example of a vehicle capable of operating autonomously or semi-autonomously, such as autonomous vehicle 101 of FIG. 1.

The vehicle 1100 may be configured to perform functions to enable teleoperations monitoring and/or control by a remote teleoperations operator. In particular, the remote teleoperations operator may view one or more real-time video streams that depict the environment of the vehicle 1100*a*. The video streams may be presented on the teleoperations human interface console. In addition, the remote teleoperations operator may interact with the teleoperations human interface console to remotely control or issue commands to the vehicle 1100. In addition, the teleoperations human interface console may present information such as the speed of the vehicle, the route of the vehicle which may be generated by the autonomy system of the vehicle, and the like. Data connectivity may be provided by modems onboard the vehicle to enable, among other things, the streaming of real-time video feeds captured by cameras of the vehicle on a teleoperations human interface console. Accordingly, the vehicle 1100 may include cameras and video process pipelines to capture videos to enable presentation of one or more video streams 1111 on a remote teleoperations human interface console. The vehicle may further include other sensors and sensor data processing pipelines 1112 such as lidars, radars, ultrasonic sensors, and the like to generate other sensor data 1113 that may be presented on the remote teleoperations human interface console. Other vehicle systems 1114 may generate non-video teleoperations data 1115 (e.g., vehicle status and health information such as health of vehicle's autonomy system) for presentation on the remote teleoperations human interface system.

Figure 12:
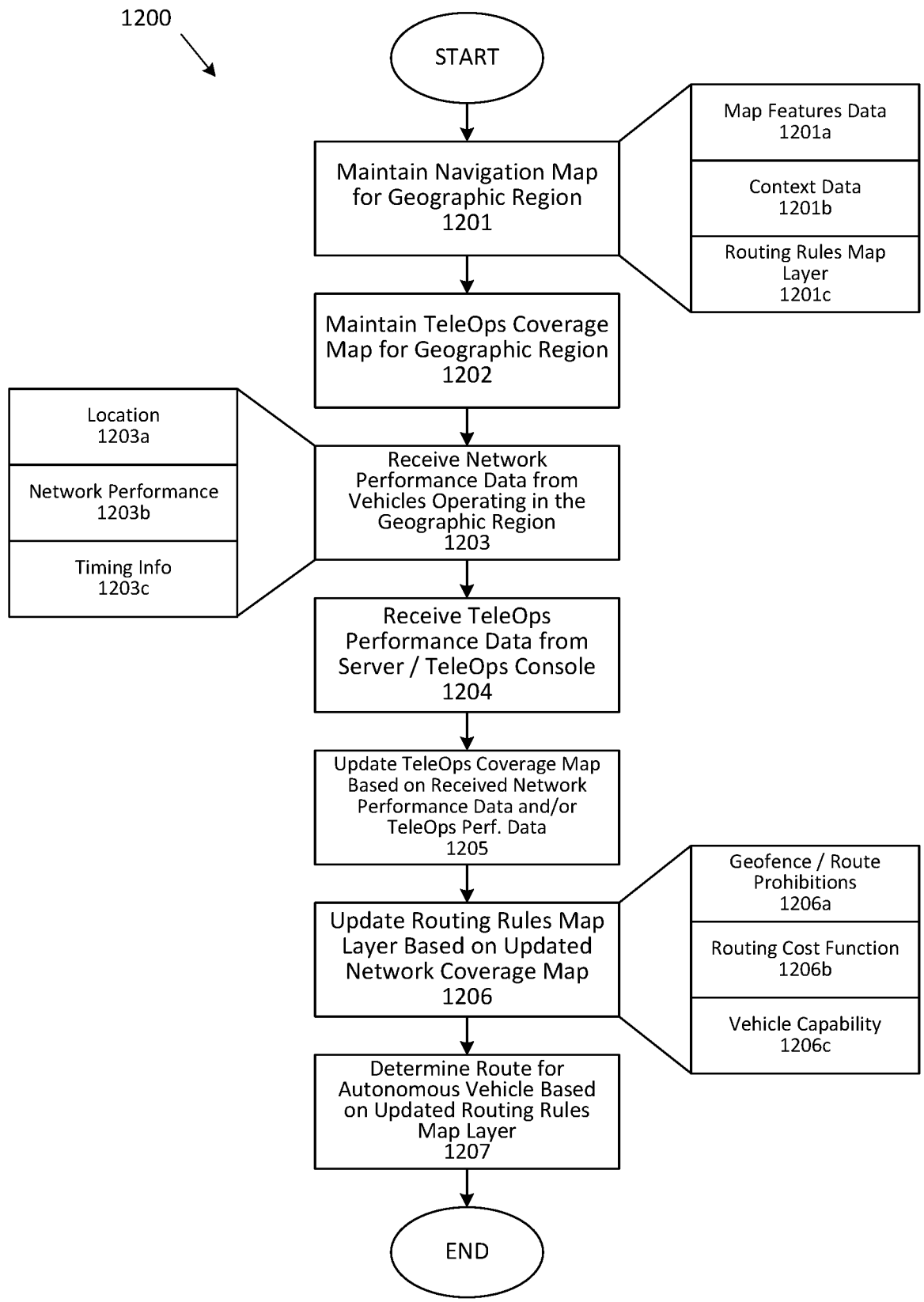
FIG. 12 is a flowchart diagram illustrating an example method for maintaining and/or updating a navigation map for autonomous vehicles, in accordance with embodiments.

According to embodiments, the vehicle 1100 may comprise a plurality of modems 1130*a-d* (e.g., cellular modems, such as 4G/5G modems) that are configured to establish a plurality of wireless data links 1150*a-d* with one or more cellular carrier or service providers 1155*a-d*. The plurality of wireless data links 1150*a-d* may concurrently transmit data from the vehicle to recipient devices such as teleoperations servers and teleoperations human interface consoles. Each of the plurality of wireless data links 1150*a-d* may be established by a respective one of the plurality of modems. In addition, each of the wireless data links 1150*a-d* may be established using distinct cellular subscriber information, such as a distinct subscriber identifying data (e.g., international mobile subscriber identity (IMSI) data and related keys). The subscriber identifying data may be stored or provided in the form of subscriber information module (SIM) cards, embedded SIMs (eSIMs), or integrated SIMs (iSIMs). As illustrated in FIG. 12, a first modem 1130*a* may be configured to establish a first wireless data link 1150*a* with a first cellular service provider 1155*a* using a first set of subscriber identifying data (IMSI 1131*a*). Similarly, a second modem 1130*b* may be configured to establish a second wireless data link 1150*b* with a second cellular service provider 1155*b* using a second set of subscriber identifying data (IMSI 1131*b*), a third modem 1130*c* may be configured to establish a third wireless data link 1150*c* with a third cellular service provider 1155*c* using a third set of subscriber identifying data (IMSI 1131*c*), and a fourth modem 1130*d* may be configured to establish a fourth wireless data link 1150*d* with a fourth cellular service provider 1155*d* using a fourth set of subscriber identifying data (IMSI 1131*d*).

In certain implementations, two or more of the modems 1130*a-d* may be configured to establish wireless data links with the same cellular service provider (but with different subscriber identities). These implementations may be employed in geographic regions with a limited number of cellular service providers providing cellular coverage. In these implementations, the robustness of the data transmission system of the vehicle may be enhanced by establishing different categories or types of wireless data links with the same cellular service provider. For example, modem 1130*a* may establish a first type of link (e.g., a 4G LTE link) with a cellular service provider using a first subscriber identity (ISMI 1131*a*) and modem 1130*d* may establish a second type of link (e.g., a 5G or 6G link) with the same cellular service provider.

Furthermore, as it may be appreciated, the wireless data links 1150*a-d* are not limited to cellular data links. For instance, one or more of the wireless data links 1150*a-d* may be two-way satellite-based data links and the modems 1130*a-d* may be satellite modems (e.g., Ku-band, Ka-band, E-band communications equipment). Similarly, one or more of the service providers 1155*a-d* may be satellite data access providers. Depending on the implementation, a combination of cellular and satellite modems may be provided and configured as modems 1130*a-d* for concurrent data transmission, as described herein. Because the performance of wireless networks such as cellular data networks or satellite-based networks vary greatly from one area to another, the use of a plurality of modems 1130*a-d* to establish a plurality of wireless data links 1150*a-d* not only enables greater network capacity, but also improves a baseline data connectivity performance that may be achieved by the vehicle over its geographic operational domain.

Data such as video streams 1111, sensor data 1113, non-video teleoperations data 1115 may be allocated for transmission by the plurality of modems 1130*a-d* over the wireless data links 1150*a-d* by an inter-modem transmission packet allocator 1120. The allocation of data for transmission across the plurality of modems 1130a-d may be performed on the basis of the modems' real-time performance (e.g., bandwidth, packet loss, latency, etc.) relative to each other. As such real-time performance may vary based on location and network performance conditions, the allocation of data across these modems may also be dynamically varied in response.

According to embodiments, the vehicle 1100 may include a wireless link performance monitor (WLPM) 1125. In one aspect, the WLPM 1125 may be configured to determine and monitor performances of the wireless data links 1150a-d. For instance, the WLPM 1125 may continuously or periodically determine various performance metrics of the wireless data links, such as bandwidth, throughput, packet loss, signal strength, latency, network jitter, etc. The WLPM 1125 may be configured to continuously or periodically determine performance metrics for each of the wireless data links 1150a-d established by modems 1130a-d onboard the vehicle and record such data for use in determining "teleoperations dead zones" (e.g., areas having low performance for teleoperations). And in certain implementations, the performance metrics (e.g., network performance data 1126) of the wireless data links 1150a-d determined by the WLPM 1125 may reflect real-time or near-time performance of the wireless data links 1150a-d. The network performance data 1126 generated by the WLPM 1125 may be transferred, uploaded, transmitted, or otherwise conveyed to an autonomous vehicle management system (AVMS) for use in generating one or more teleoperations coverage maps and/or updating routing rules for a fleet of autonomous vehicles managed by the AVMS.

FIG. 12 is a flowchart diagram illustrating an example method for maintaining and/or updating a navigation map for autonomous vehicles, in accordance with embodiments. Referring to earlier figures, the method 1200 may be performed by, for example, the autonomous vehicle management system AVMS 1000 of FIG. 10.

At step 1201, the AVMS maintains a navigation map of a geographic region. The geographic region may correspond to or include a metroplex such as the San Francisco Bay Area. The navigation map may be generated, maintained, or used to operate one or more fleets of autonomous vehicles. For example, the navigation map may include map features data 1201a that includes a data representation of navigable areas (e.g., streets, roads, expressways, highways, etc.) for the autonomous vehicles, context data 1201b, and a routing rules map layer 1201c. In particular, the routing rules map layer 1201c may include routing restrictions, routing prohibitions, and routing cost functions associated with, for example, considerations for teleoperations performance.

At step 1202, the AVMS may further generate, maintain, and/or update teleoperations coverage map for the geographic region. The teleoperations coverage map may correspond to a data representation of the expected performance of teleoperations across the geographic region. The teleoperations coverage map may be generated and/or updated based on network performance data measured and obtained by vehicles managed by the AVMS and/or other vehicles operating within the geographic region. In addition, or as an alternative, the teleoperations coverage map may be generated and/or updated based on other sources of network performance information. Still further, the teleoperations coverage map may be generated and/or updated based on teleoperations performance data such as rates of disconnections of active teleoperations sessions, performance of teleoperations video feeds (e.g., bit rates, frame rates, resolutions, latencies associated with the teleoperations video feeds), etc.

For example, the AVMS may receive, maintain, and aggregate a collection of network performance data generated by a plurality of vehicles operating in the geographic region over time. As network performance conditions across the geographic region may change over time, the teleoperations coverage map may be maintained and updated based on the collection of network performance data. The frequency of the updates may depend on the particular implementation. In some implementations, the teleoperations coverage map may be updated dynamically in response to receipt of newly generated network performance data from a vehicle operating in the geographic region. Alternatively, the teleoperations coverage map may be updated periodically (e.g., processing all the network performance data received during the time period since the last update of the teleoperations coverage map).

The teleoperations coverage map may provide indications of areas within the geographic region that are associated with low-quality network performance. For instance, the geographic region may be divided or segmented into map tiles. Each map tile may correspond to a geographic area within the geographic region. In one embodiment, the map tiles may be hexagonal in shape although any shape of map tiles may be implemented. For a given map tile, the teleoperations coverage map may provide an indication of whether the area represented by the map tile is associated with low performance (e.g., whether the geographic area represented by the map tile is a "dead zone").

In one aspect, the information provided by the teleoperations coverage map may relate to support of an application or use in operating the fleet of autonomous vehicles. As one example, areas indicated by the teleoperations coverage map as areas of low performance (e.g., "dead zones") may be areas that are associated with network performance that is estimated or anticipated (e.g., by statistical modeling of network performance data or by actual empirical evidence of teleoperations disconnections) to be incapable of reliably supporting teleoperations monitoring and/or control of an autonomous vehicle when the autonomous vehicle is within those areas. In other examples, an area may be determined to be a "dead zone" based on determinations that network performance associated with the area may be insufficient to provide other autonomous vehicle functionalities such as downloading of map data, uploading of autonomy health data, logging functions, etc.

At step 1203, the AVMS may receive a set of network performance data from a vehicle operating in the geographic region. The set of network performance data may indicate a location 1203a (e.g., the location at which network performance was measured), network performance metrics 1203b, and timing information 1203c (e.g., times at which the network performance was measured). For example, the set of network performance data received from the vehicle may include a plurality of data points. Each data point may include information relating to location 1203a (e.g., a location associated with the data point by way of, for example, GPS coordinates) and timing information 1203c (e.g., a time associated with the data point). The network performance metrics 1203b of the data point may indicate, for example, latency, packet loss rate, bandwidth, round-trip time (RTT), signal strength, and/or other metrics indicative of network as measured at the location 1203a and at the time indicated by the timing information 1203c. To generate the set of network performance data, the vehicle may obtain a plurality of data points as it operates in the geographic region.

According to embodiments, the set of network performance data generated by the vehicle may be uploaded or transmitted to the AVMS in real-time. "Real-time" may, in some embodiments, include transmitting data as soon as practically possible. Because of delays inherent in the processing of data, transmission of data, and/or in execution of computing tasks, the term "real-time" encompasses operations that occur in "near" real-time or somewhat delayed. In other embodiments, the set of network performance data may be transmitted or uploaded by the vehicle to the AV management system periodically or during times of low network usage by the vehicle (e.g., when the vehicle has completed operations and has returned to a depot or a facility, when the vehicle is not under teleoperations monitoring or control, or when the vehicle has stopped temporarily, etc.).

In certain embodiments, the vehicles in the autonomous vehicle fleet may each be equipped with multiple modems that are configured to simultaneously transmit and receive data in order to increase total bandwidth available for autonomous operations, including for teleoperations monitoring and/or control of the vehicles of the autonomous vehicle fleet. In addition, the multiple modems may be configured to establish wireless data links (e.g., cellular links such as 4G LTE, 5G, or 6G links) with multiple service providers. For instance, each of the multiple modems may be configured with respective subscriber identity information for each of the modems (e.g., using respective subscriber identity module (SIM) cards, electronic SIMs (eSIMs), integrated SIMs (iSIMs), etc.) such that the multiple modems establish wireless data links with multiple service providers. And a vehicle of the AV fleet (or a test vehicle) may simultaneously transmit data over the multiple modems. For instance, the vehicles may each comprise a data transmission allocation module to allocate data between the multiple modems based on the network conditions, reception, and/or current performance of each of the modems and established wireless data links. In this manner, not only may the vehicles of the AV fleet effectively increase the available network bandwidths available for transmitting and receiving data, but they may also leverage the network coverage provided by multiple network service providers to reduce "dead zones" within the geographic region in which they operate. In addition, two or more of the modems of a vehicle may be configured (e.g., via hardware configuration, via subscriber information, etc.) to establish connections with wireless networks of different types (e.g., 4G vs 5G), resulting in different network coverages even if these connections are established with the same service provider). Still further, the vehicles may be equipped with modems of different types (e.g., cellular modem and satellite modem). Still further, the vehicles within the AV fleet may have differing configures with respect to communication interfaces and/or modems. For instance, a first vehicle of the AV fleet may be equipped with multiple 4G modems. A second vehicle of the AV fleet may be equipped with 4G and 5G modems. And a third vehicle of the AV fleet may be equipped with 4G and satellite modems.

In the multi-modem, multi-service provider, and/or multi-connection type implementations discussed above, the network performance data generated by the vehicle may further include indications of the connection type and the service provider identifier. For example, a data point of the network performance data collected at a particular location 1203*a* and at a particular time 1203*c* may include a plurality of sets of network metrics, each of the sets of network metrics being obtained for a respective one of the wireless data links maintained by the vehicle. And each of the sets of network metrics may be associated with an indication of the network type and/or service provider identity.

At step 1204, teleoperations performance data may be received or otherwise obtained by the AVMS. In certain implementation, the teleoperations performance data may be received by the AV management system from a teleoperations server or a teleoperations human interface system. In other implementations, the AV management system may perform functions relating to one or more aspects of enabling or facilitating teleoperations monitoring and/or control of vehicles in the AV fleet and the AV management system may maintain the teleoperations performance data.

According to embodiments, the teleoperations performance data may relate to the performance of teleoperations monitoring and/or control of vehicles in the AV fleet while those vehicles operate within the geographic region. In one aspect, teleoperations performance data may include data pertaining to loss of one or more functions or capabilities during an active teleoperations session such as a loss of a video feed, occurrence and/or frequency of a disconnection of the teleoperations session, whether the lost video feed or the disconnection was restored within a time threshold, and/or time taken to restore these functionalities. In another aspect, teleoperations performance data may include frame rates of one or more real-time video streams streamed from the vehicle for presentation on a remote teleoperations human interface console.

At step 1205, the teleoperations coverage map may be updated. In general, the AVMS may determine whether each map tile within the geographic region should be identified as having low performance for teleoperations. For a particular map tile, the AVMS may determine whether to do so based on the network performance data collected by one or more vehicles operating within a geographic area that corresponds to the map tile. The designation of a map tile as having low performance for teleoperations is illustrated and described in additional detail with respect to FIG. 13. In addition, or as an alternative, the AVMS may determine whether to designate the map tile has having low performance for teleoperations based on the teleoperations performance data generated during active teleoperations sessions of autonomous vehicles operating within the geographic area that corresponds to the map tile.

In another aspect, a map tile's designation of having low performance for teleoperations may be removed by the AVMS during the update performed at step 1205. In general, a map tile's designation of having low performance for teleoperations may be removed based on an expiration of the designation and/or updated performance data (e.g., updated network performance data and/or updated teleoperations performance data) indicating that the expected performance of teleoperations functions meet certain performance thresholds. The removal of a map tile's designation as having low performance for teleoperations is illustrated and described in additional detail with respect to FIG. 14.

In one embodiment, an autonomous vehicle fleet comprise vehicles having different communication interfaces and/or capabilities. For instance, a portion of the fleet may have cellular modems while another portion of the fleet may be equipped with satellite modems in addition to cellular modems. Due to differences in communication capabilities, the expected teleoperations performance for these two configurations of vehicles may differ. Thus, multiple teleoperations coverage maps may be generated at step 1205—one may be generated for vehicles equipped with only cellular modems and another may be generated for vehicles equipped with both cellular and satellite modems. In this manner, different routing rules may also be generated for the different configurations of vehicles and the generation of routes with consideration for teleoperations performance may also differ between the different configuration of vehicles.

According to embodiments, a visualization of the updated teleoperations coverage map may also be generated as part of step 1205. The visualization may take form as a heat map. For example, the visualization may include a map of the geographic region with one or more layers that identify areas in which teleoperations support is expected to perform poorly or unreliably (e.g., "teleoperations dead zones").

At step 1206, the routing rules map layer may be updated based on the updated teleoperations coverage map. At a high level, one or more routing rules and/or routing constraints for determining routes of the vehicles of the autonomous vehicle fleet may be updated, modified, or generated based on the updated teleoperations.

For certain embodiments, geofences and/or route prohibitions 1206a may be generated based on the updated teleoperations coverage map. For instance, the routing rules map layer of the navigation map may be updated to include a geofence and/or a routing prohibition that prevents the generation of routes that would cause any of the vehicles of the autonomous vehicle fleet to be routed through map tiles that are designated as having low performance for teleoperations. In effect, the vehicles of the autonomous vehicle fleet would be routed around the areas designated as having low performance for teleoperations.

As an alternative, instead of outright prohibition of generation of routes through map tiles that are designated as having low performance for teleoperations, the AVMS may be configured to use low performance teleoperation designations of map tiles as a factor or variable in generating routes for vehicle of the autonomous vehicle fleet. Algorithms for determining routes for vehicles often weigh various "costs" associated with each possible route (e.g., in terms of travel time, distance traveled, convenience of route, etc.) and select the route having the lowest total "cost" as the optimal route. Routes that may experience unavailability, unreliability, or poor performance for teleoperations monitoring and/or control of vehicles may be imposed additional "cost" in the route generation or determination process. For instance, in the route generation and/or determination process, routing cost functions 1206b may be imposed on routes passing through map tiles designated as having low performance for teleoperations. In this manner, expected availability, reliability, and/or performance of teleoperations monitoring and/or control of vehicles in along the routes generated may be an additional factor or variable in the optimal route determination. The routing cost function 1206b associated with low performance for teleoperations on route segments in a map tile may be dependent on the expected performance of teleoperations for the map tile. For example, a first map tile in which vehicles are expected to have particularly poor network connectivity may be associated with a "high cost" (in addition to the other routing cost considerations) whereas a second map tile in which vehicles are expected to have mediocre network connectivity may be associated with a "medium cost." In contrast, a third map tile in which vehicles are expected to have good network connectivity may be associated with no cost in addition to the other routing cost considerations such as distance and travel time.

In addition, or as an alternative, parameters such as a maximum amount of consecutive time or consecutive distance in areas of low performance for teleoperations may be implemented in the route determination algorithms for vehicles of the autonomous vehicle fleet. The implementation of such parameters may allow a route to briefly traverse a map tile in which teleoperations may be unreliable (for which risk of on-road issue may be minimal) but prohibit a route through consecutive map tiles in which teleoperations functions may become degraded (for which there may be an elevated risk of on-road issues due to the long amount of time or distance the vehicle has to travel with potentially degraded teleoperations support). In this manner, the possibility of teleoperations performance leading to on-road issues may be minimized without eliminating all routing possibilities through map tiles designated as having low performance for teleoperations.

According to embodiments, geofences (or routing prohibitions) may be utilized in conjunction with routing cost functions in generating routes that take into consideration expected performance of teleoperations along the routes. As one example, vehicles may be allowed to be routed through areas low performance for teleoperations if the route does not include any segments in which the autonomy system of the vehicle is expected to require active monitoring and/or assistance for a remote teleoperations operator. In other words, route constraints or prohibitions may not blanketly prevent routes through a map tile designed as having low performance for teleoperations from being generated. Rather, specific routes through areas that are known or expected to cause issues with the autonomy system of the vehicles of the autonomy vehicle fleet may be prohibited but other routes through those map tiles may be allowed (e.g., with an imposed routing cost function).

In addition, vehicle capabilities 1206c may be taken into consideration when updating the routing rules map layer. As one example, AVMS may take into account differences in vehicle capability in terms of the autonomy system. A first vehicle in the autonomous vehicle fleet having a more capable set of autonomy functionalities may be permitted to traverse a map tile with low performance for teleoperations while a second vehicle having a less capable autonomy system may not be permitted to traverse into such a map tile. In this manner, a routing prohibition for the map tile may be imposed on vehicles in the fleet that are similar in configuration to the first vehicle while a routing cost function may be imposed on vehicles similar to the second vehicle.

At step 1207, routes for vehicles of the AV fleet may be determined in accordance with the geofences, routing prohibitions, routing constraints, routing rules, routing cost functions, and/or other parameters specified routing rules map layer. In particular, vehicles may be prevented from transiting through areas that are deemed to have poor network performance to support teleoperations. In the alternative, additional "cost" may be imposed on route segments that transit areas with low performance for teleoperation in determining the optimal route for vehicles. In this manner, the generated routes for the vehicles take into consideration expected teleoperations performance in the various areas within the geographic region.

Figure 13:
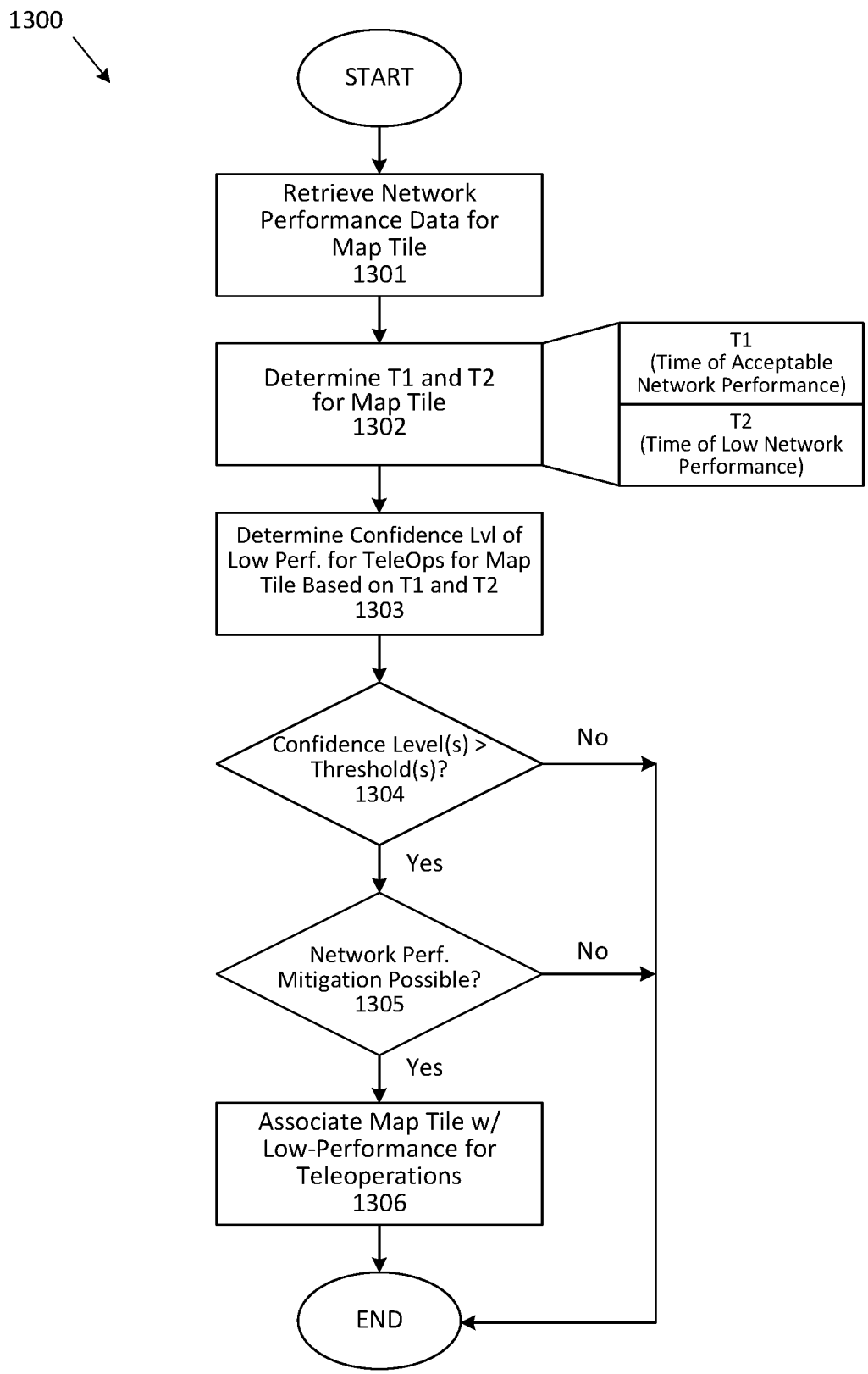
FIG. 13 is a flowchart illustrating an example process in designating a map tile as having low performance for teleoperations based on network performance data, in accordance with embodiments.

FIG. 13 is a flowchart illustrating an example process in designating a map tile as having low performance for teleoperations based on network performance data, in accordance with embodiments. The process 1300 illustrated in FIG. 13 may be performed by, for example, the AVMS 1000 of FIG. 10. In particular, it may be performed by the teleoperations coverage map module 1020 of FIG. 10.

Referring to FIG. 12, the process 1300 illustrated in FIG. 13 may be performed as part of step 1205 of FIG. 12.

At step 1301, the AVMS retrieves network performance data for a map tile. The network performance data retrieved at this step may include recent network performance data collected by a vehicle while in the geographic area represented by the map tile.

At step 1302, the AVMS computes or determines T1 and T2 for the map tile based on the retrieved network performance data. T1 may represent time (e.g., number of seconds) the vehicle is in the geographic area represented by the map tile while having acceptable network performance. T2 may represent time (e.g., number of seconds) the vehicle is in the geographic area represented by the map tile while having unacceptable network performance.

T2 may be computed as the amount of time (while the vehicle is located in the geographic area represented by the map tile) during which the vehicle's bandwidth is below a bandwidth threshold level. In addition, or as an alternative, T2 may be computed as the amount of time during which the vehicle's packet loss rate is above a packet loss threshold level. In addition, or as yet another alternative, T2 may be computed as the amount of time during which the vehicle's communication round-trip time (RTT) is above an RTT threshold level. In one embodiment, T2 may be the amount of time any of the foregoing thresholds levels are satisfied. T1, on the other hand, may be computed as the remainder of time the vehicle is within the map tile (e.g., T$1=T_{TOTAL\_IN\_MAP\_TILE}$−T2).

In one embodiment, the network performance metrics associated with the map tile used in determining T1 and T2 may be combined network metrics for the wireless data links established by the plurality of modems onboard the vehicle. For instance, bandwidth may refer to a combined bandwidth of all of the wireless data links established by the plurality of the vehicle's modems and packet loss rate may be a combined measure of packet loss rate across all of the wireless data links established by the plurality of the vehicle's modems.

At step 1303, the AVMS computes or determines a confidence level of low performance for teleoperations for the map tile based on computed T1 and T2. Based on T1 and T2 for the map tile (e.g., based on a ratio of T2 to T1, or a ratio of T2 to $T_{TOTAL\_IN\_MAP\_TILE}$) as measured by a plurality of vehicles that pass through the geographic area represented by the map tile, a measure of confidence (e.g., P95 confidence intervals) of degraded network performance may be computed. This measure of confidence may be used to designate the map tile as having low performance for teleoperations.

At step 1304, if the confidence level(s) determined at step 1303 exceed threshold level(s), the process may continue onto step 1305. If the confidence level(s) are below threshold level(s), the process 1300 may end without designating the map tile as having low performance for teleoperations. Another outcome may be that spread between the computed P95 confidence intervals are too large. In such a case, this outcome may indicate that there is not sufficient data to designate the map tile as having low performance for teleoperations and thus the process 1300 may similarly end without designating the map tile as having low performance for teleoperations.

At step 1305, network performance data may be evaluated to determine whether mitigation of the detected shortfalls in network performance within the map tile is possible. For example, it may be determined that the packet loss rate threshold was satisfied due to one of the wireless data links established by one of the plurality of the vehicle's modems is performing particularly poorly. In such a case, the remainder of the vehicle's wireless data links may be sufficient to support acceptable teleoperations performance. In such a case, it may be determined that mitigation is possible by not allocating data for transmission over the particularly poor performing wireless data link while the vehicle is within the geographic area represented by the map tile. In other instances, it may be determined that reconfiguring the modems or the wireless data links, such as modifying subscriber information, switching link type (e.g., 4G to 5G), and substituting one network service provider for another, may be sufficient to mitigate the detected shortfalls in network performance within the map tile. If mitigation is possible, the process 1300 may end without designating the map tile as having poor performance for teleoperations.

At step 1305, after determining that no mitigation is possible for the detecting shortcomings in network performance, the map tile may be associated with or designated as having poor performance for teleoperations.

Figure 14:
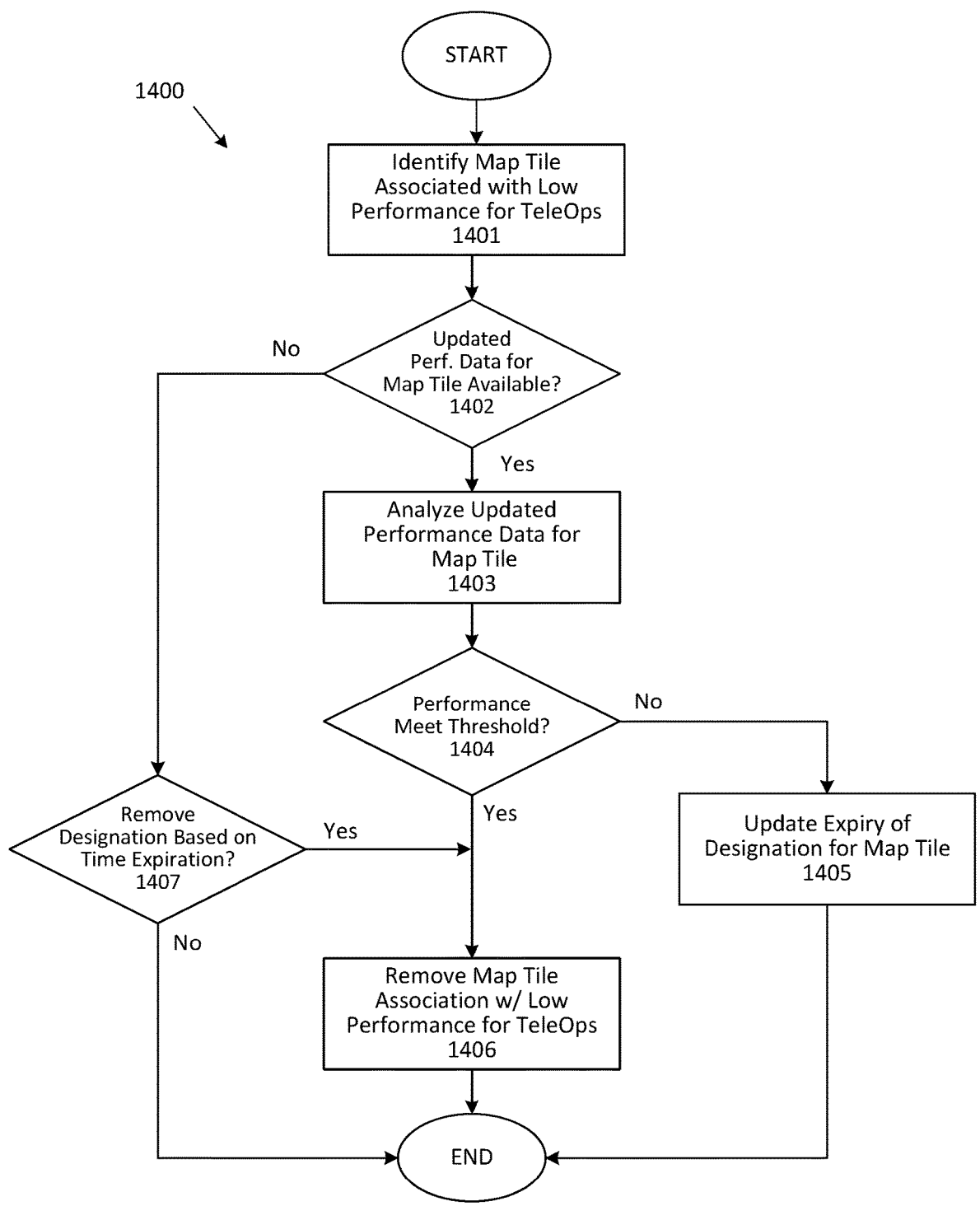
FIG. 14 is a flowchart illustrating an example method of removing a map tile's designation as having low performance for teleoperations, in accordance with embodiments.

FIG. 14 is a flowchart illustrating an example method of removing a map tile's designation as having low performance for teleoperations, in accordance with embodiments. The process 1400 may be performed each time the teleoperations coverage map is updated. Alternatively, or in addition, the process 1400 may be performed periodically to ensure that "dead zone" or "teleoperations dead zone" designations (e.g., designations of map tiles as having low performance for teleoperations) is up to date. In certain embodiments where vehicles are prevented from being routed into "dead zone" areas, the network performance of such areas may not be collected after such a designation. Thus, as network performance conditions in these areas may change and improve (e.g., as network access points or nodes such as cellular towers are added to service providers' networks, or as degraded network access points are repaired), it is beneficial to remove "dead zone" designations for map tiles that are based on network performance data that may be outdated. In particular, if network performance conditions in such areas have improved, the operational domain of the autonomous vehicle fleet within the geographic region may be increased and the routing and operations of the autonomous vehicle fleet may be improved.

At step 1401, the AVMS identifies a map tile that that is associated with or designated as having low performance for teleoperations.

At step 1402, the AVMS determines whether updated performance data for the map tile is available. Updated performance data may refer to network performance data and/or teleoperations performance data. The updated performance data may be data that were collected or aggregated since the last time update for the teleoperations coverage map.

If no updated performance data for the map tile exists, the process 1400 may proceed to step 1407 where the AVMS determines whether to remove the designation of low performance for teleoperations (e.g., a "dead zone" designation) based on a time expiration. In one aspect, a "dead zone" designation, when determined by the AVMS and associated with the map tile, has a corresponding expiration time after which the designation is to be removed by the AVMS. In one embodiment, the expiration time is one week after the designation is assigned to the map tile. In another embodiment, the expiration time is a month after the designation is assigned to the map tile. The expiration time may vary based on historical data associated with the geographic region. If the designation has expired, the process 1400 may proceed to step 1406 in which the AVMS removes the map tile's designation as having low performance for teleoperations. Otherwise, the process 1400 may end without the AVMS removing the map tile's designation as having low performance for teleoperations.

If updated performance data for the map tile exists, the process 1400 may proceed to step 1403 in which the AVMS analyzes the updated performance data (e.g., network performance data and/or teleoperations performance data) for the map tile. At step 1404, if the updated performance data meets performance thresholds (e.g., confidence level thresholds of obtaining acceptable teleoperations performance), the process 1400 may proceed to step 1406 in which the AVMS removes the map tile's designation as having low performance for teleoperations. On the other hand, if the updated performance data indicates that the map should continue to be designated as a "dead zone" (e.g., having low performance for teleoperations), the expiration of the designation may be updated (e.g., extended by, for example, a week, a month, etc.) at step 1405 and the process 1400 may conclude.

Figure 15:
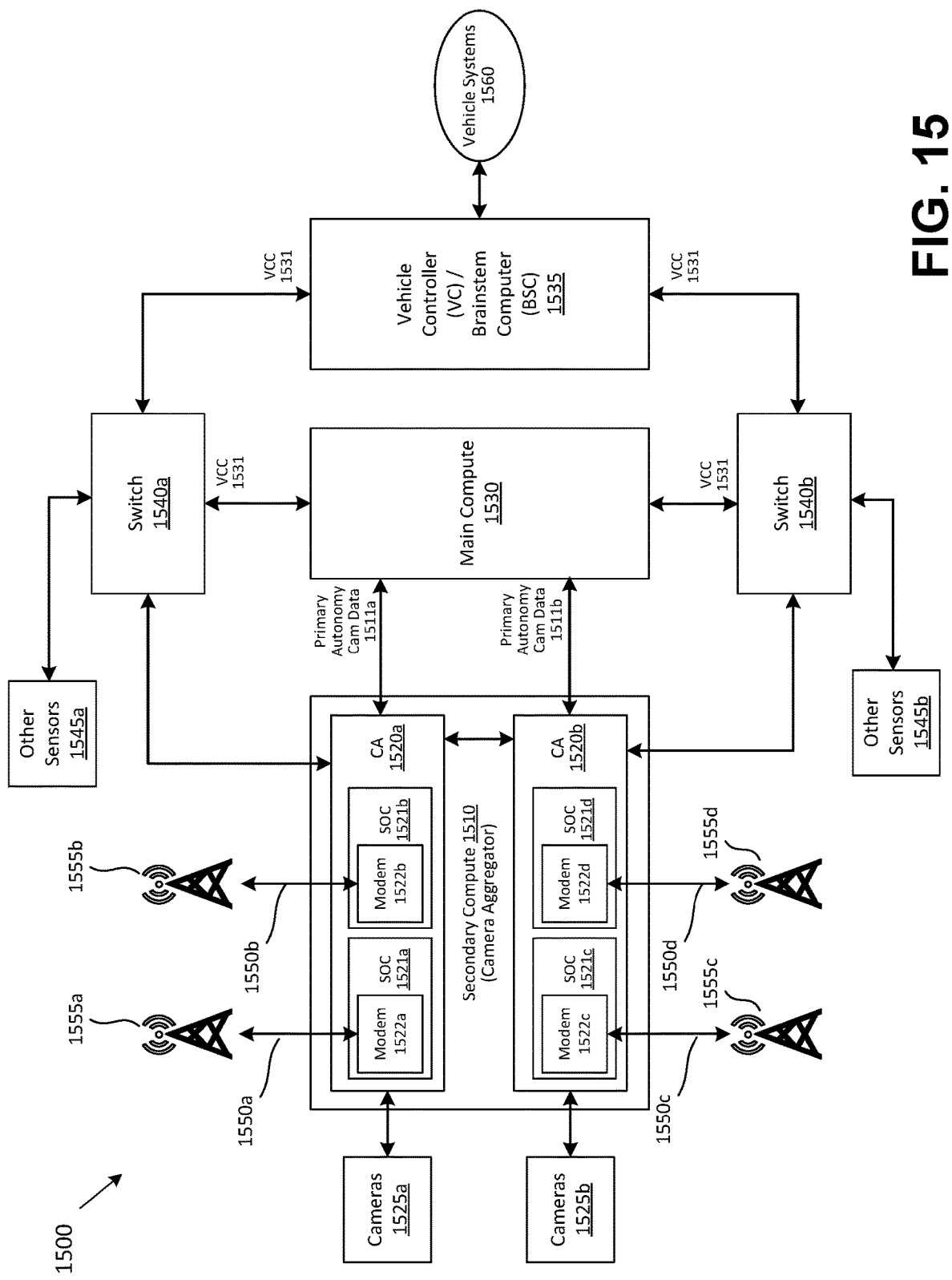
FIG. 15 is a block diagram of systems and components of an example vehicle capable of autonomous or semi-autonomous operations, in accordance with embodiments.

FIG. 15 is a block diagram of systems and components of an example vehicle capable of autonomous or semi-autonomous operations, in accordance with embodiments. Vehicle 1500 illustrated in FIG. 15 may be an example of vehicle 101 illustrated in and described with respect to FIGS. 1-3 and/or vehicle 1100 illustrated in FIG. 11. The vehicle 1500 may comprise a secondary compute 1510, a main compute 1530, a vehicle controller or brainstem computer 1535, and one or more switches 1540*a* and 1540*b*.

According to embodiment, at least some of the components of the autonomous vehicle 1500 (e.g., main compute 1530, secondary compute 1510, vehicle controller 1535, various sensors, etc.) may be communicatively coupled via a communication network such as an Ethernet network. The switches 1540*a* and 1540*b* may be Ethernet switches configured to forward data between at least some of these components (e.g., in accordance with a pre-defined data forwarding table). However, the secondary compute 1510 may be configured to communicate with the main compute 1530 via a direct network connection (i.e., without being forwarded by the switches 1540*a* and 1540*b*). As may be appreciated, depending on the specific implementation, communications between any pair of components via the communication network may be achieved either through use of the switches 1540*a-b* or via direction connections.

According to embodiments, the main compute 1530 may implement a primary autonomy system by executing autonomy software instructions. The main compute 1530 may receive sensor data, such as data from cameras 1525*a* and 1525*b* and other sensors 1545*a* and 1545*b*. The other sensors 1545*a* and 1545*b* may include LiDARs, radars, ultrasonic sensors, and the like. The primary autonomy system implemented by the main compute 1530 may include a perception subsystem to interpret the sensor data to obtain an understanding of the environment surrounding the autonomous vehicle 1500 (e.g., including object/agent identification/classification, path/intent determination of nearby agents, etc.), a pose and localization subsystem to determine the pose of the vehicle and the precise location of the vehicle in relation to detailed map data, and a planning subsystem to plan a path and/or maneuvers for the vehicle in navigating its environment based on the outputs of the perception subsystem and the pose and localization subsystem. The main compute 1530 may generate a set of primary autonomy commands and/or trajectories to control or operate the vehicle 1500 in an autonomous or semi-autonomous manner based on the planned path generated by the path planning subsystem. The primary autonomy commands and/or trajectories generated by the main compute 1530 (e.g., vehicle control commands (VCC) 1531) may be forwarded to the vehicle controller 1535 which controls various systems of the vehicle including, for example, the drivetrain motor, the brakes, and steering to cause the vehicle to move in accordance with the primary autonomy commands and/or trajectories. The VCC 1531 may be forwarded over the Ethernet network via one or more of the switches 1540*a* and 1540*b*.

According to embodiments, vehicle 1500 may include a secondary compute 1510. The secondary compute 1510 may be configured to process data from cameras 1525*a* and 1525*b* onboard the vehicle 1500 and thus may also be referred to as the "camera aggregator" or "camera data aggregator." The cameras 1525*a* and 1525*b* onboard the vehicle 1500 may include long-range cameras and short-range cameras. The long-range cameras onboard the vehicle 1500 may provide full 360-degree long-range view coverage of the environment surrounding the vehicle 1500. The short-range cameras onboard the vehicle 1500 may provide full 360-degree near-field coverage of the environment surrounding the vehicle 1500 and/or provide coverage of one or more "blind spots" of the long-range cameras (e.g., areas in close proximity to the vehicle 1500).

The secondary compute 1510 may include a plurality of processors or "systems on chip" (SOCs) 1521*a-d* and/or other digital signal processors (DSPs) to process the data generated by the cameras. The SOCs 1521*a-d* of the secondary compute 1510 may be arranged into two separate computing assemblies. For example, SOCs 1521*a-b* may be configured as part of computing assembly 1520*a* and SOCs 1521*c-d* may be configured as part of computing assembly 1520*b*. The processors (e.g., the SOCs 1521*a-d* and/or DSPs) within the secondary compute 1510 may implement image/video data processing pipelines to generate video streams by, for example, stitching together images or video from multiple cameras, encoding videos, and/or modifying bit rates, frame rates, resolutions, aspect ratios, or other aspects of the video streams. Data from the cameras 1525*a* and 1525*b* may be processed by the secondary compute 1510 for use by the main compute 1530 in implementing the primary autonomy system. For example, the secondary compute 1510 may generate primary autonomy camera data 1511*a* and 1511*b*. These output data streams may be generated specifically for consumption by, for example, the perception subsystem to decipher and understand the environment of the vehicle 1500. In addition, as discussed further below, the secondary compute 1510 may generate one or more video streams for enabling teleoperations monitoring of the vehicle 1500 by a remote teleoperations operator.

In addition to processing data from the cameras 1525*a-b*, the secondary compute 1510 may execute instructions to implement a backup autonomy system. According to embodiments, functionalities of the backup autonomy system may include parallel autonomy functionalities, which may be performed concurrently with the main compute 1530 implementing the primary autonomy system. In certain implementations, the parallel autonomy functionalities may be implemented based on data generated by at least some of the sensors that are used in the implementation of primary autonomy functionalities, such as LiDARs, radars, and the cameras 1525*a-b*. The parallel autonomy functionalities may, independently from the primary autonomy functionalities, determine whether the vehicle is likely to encounter unsafe conditions (e.g., a collision, veering off the road, etc.). In some examples, inputs used to implement parallel autonomy may include primary autonomy commands or trajectories generated by primary autonomy. The parallel autonomy functionalities may override primary autonomy vehicle controls if parallel autonomy determines that, for example, a collision is likely.

According to embodiments, the functionalities implemented by the backup autonomy system may also include failover autonomy functionalities, which may be implemented in response to detection of a fault, failure, degradation, or issue associated with the primary autonomy system implemented by the main compute 1530. For instance, hardware faults such as failure of main compute 1530, switches 1540*a* or 1540*b*, or one or more sensors (e.g., lidar, radar, etc.) that causes or may cause failure, fault, degradation, or issues of the performance of the primary autonomy system may trigger the implementation of failover autonomy functionalities. Software or algorithmic faults in implementing the primary autonomy system may also trigger the implementation of failover autonomy functionalities. Once triggered, failover autonomy may take over control of the vehicle from primary autonomy (and/or teleoperations) to bring the vehicle to a safe stop (e.g., in view of the vehicle's current speed, trajectory, and surroundings).

In various implementations, the backup autonomy system may perform parallel autonomy functionalities and/or failover autonomy functionalities based on data generated by the cameras 1525*a-b*. The SOCs 1521*a-d* and/or DSPs of the secondary compute 1510 may generate one or more backup autonomy video streams specifically for the backup autonomy system. In other words, these backup autonomy video streams may be generated separately from the video streams for the primary autonomy system (e.g., primary autonomy camera data 1511*a-b*) and/or the video streams for enabling teleoperations monitoring of the vehicle 1500.

According to embodiments, the secondary compute 1510 may further execute instructions to enable teleoperations monitoring and/or control of the autonomous vehicle 1500 by a remote teleoperations operator. Data generated by the cameras 1525*a-b* may be processed and transmitted to enable the presentation of one or more real-time video streams on a device of the remote operator (e.g., on a teleoperations human interface console). For instance, the SOCs 1521*a-d* of the secondary compute 1510 may each comprise a wireless modem 1522*a-d* for establishing wireless data links 1550*a-d* (e.g., 4G, LTE, 5G, 6G links, satellite data links, etc.) with service providers 1555*a-d*. The modems 1522*a-d* may be used to transmit video and other data to enable teleoperations monitoring and/or control of the vehicle 1500. The video and other data to enable teleoperations may be transmitted by the modems 1522*a-d* to teleoperations server(s) and/or to teleoperations human interface consoles operated by teleoperations operators. In particular, data, including data of a particular video stream, may be transmitted concurrently or simultaneously by the modems 1122*a-d* over the wireless data links 1550*a-d*. Furthermore, the video streams for enabling teleoperations may be distinct from the video streams for supporting primary autonomy functionalities and/or backup autonomy functionalities. For instance, the video streams for enabling teleoperations may have different bit rates, frame rates, resolutions, etc. compared to the video streams for supporting primary autonomy functionalities and/or backup autonomy functionalities.

According to embodiments, the autonomous vehicle 1500 may comprises multiple power domains, including at least one high voltage power domain and multiple low voltage power domains. As used herein, "low voltage" may refer to a wide range of voltages. In certain implementations, low voltage may be any voltage that is less than 50 volts (e.g., 12V, 48V, etc.). The terms "low voltage" and "high voltage" may also simply refer to voltage ranges relative to each other (e.g., low voltage may refer to any voltage in the 0V to 60V voltage range while high voltage may refer to any voltage above 60V). Furthermore, a power domain may refer to a collection of components that are powered by the same power supply. In the context of a low voltage power domain, the collection of components within the low voltage power domain may each receive power from the same low voltage power distribution unit (LVPDU). Different low power domains may be isolated from one another for reliability and durability considerations.

The secondary compute 1510 may include two or more computing assemblies such as 1520*a* and 1520*b*. Computing assembly 1520*a* may be powered by a different power domain as compared to computing assembly 1520*b*. In addition, the cameras 1525*a-b* and other sensors 1545*a-b* may also be powered by separate power domains. Furthermore, computing assembly 1520*a* may process data from cameras 1525*a* while computing assembly 1520*b* may process data from cameras 1525*b*. In addition, the switches 1540*a* and 1540*b* may also be powered by separate power domains. And the main compute 1530 and the vehicle controller 1535 may be powered by either one of the power domains. In doing so, the reliability and durability of the autonomous vehicle 1500 may be dramatically improved. In particular, in the event of a failure of a power domain, at least sensors and compute systems powered by the other power domain may still enable the autonomous vehicle 1500 to safely perform an emergency stop or pull-over maneuver.

Although only a few embodiments have been described in this disclosure, it should be understood that the disclosure may be embodied in many other specific forms without departing from the spirit or the scope of the present disclosure. By way of example, the ability to determine geographical regions through which autonomous vehicle routes are to be avoided may facilitate decisions as to which areas a fleet of autonomous vehicles may be successfully deployed. If a particular geographical region is identified as a region in which there is consistently a low level of performance associated with a cellular and/or wireless network, such a geographical region may be deemed to be an area in which delivery services are not to be offered.

Effectively identifying a geographical area or zone which has network performance issues as an area or zone to be avoided when determining a route or path for an autonomous vehicle generally effectively ensures that a teleoperations system may safely operate the autonomous vehicle. It should be appreciated that in lieu of preventing a routing system from routing through an area in which network performance may not meet performance standards, routing system may instead use information about inadequate network performance as a factor, e.g., a weighted factor, when creating a route for an autonomous vehicle. In other words, the performance of a cellular and/or wireless network in a geographical area may be used as one factor in a vehicle routing determination. That is, the network performance may be just one of many factors considered when creating a route for an autonomous vehicle. For example, other factors in a routing determination may be such that a route through an area in which network performance is less than desired may be preferred over other routes because the other factors may weigh more heavily than network performance when determining a route.

Information which relates to whether a geographical areas associated with particular cellular and/or wireless network service may be substantially obtained or collected as remote operators using teleoperations systems are monitoring vehicles. The information may be collected by remote operator, or the information may be substantially automatically collected when a teleoperations system is being used by a remote operator. In one embodiment, such remote operators may periodically obtain the information and provide the information for use to assess whether a geographical area is to be substantially labeled as a dead zone, and/or whether a geographical area is to be substantially labeled as no longer being a dead zone. In some instances, information may be collected by sensors on a vehicle, and may be provided by the vehicle to a backend system which may cause the information to be processed to identify the existence or non-existence of a dead zone. That is, information used to assess network performance in a geographical area may be automatically obtained, and may be processed using any suitable backend system.

As mentioned above, an assessment regarding whether a particular geographical area is a dead zone or otherwise does not meet network performance standards ay occur substantially in real time. That is, a geographical area may effectively be identified or otherwise marked as not meeting network performance or service standards while a vehicle is being monitored using a teleoperations system. When the geographical area is identified as not meeting network performance standards while a vehicle is operating, the information relating to the geographical area may be uploaded to the backend system. In one embodiment, the backend system may utilize weights on the information to determine a routing cost if the vehicle is to be routed through the geographical area.

The size and shape of a dead zone, or a geographical area to be avoided when generating a route, may vary widely. Factors used to define boundaries of a dead zone may also vary widely. In one embodiment, the boundaries used to substantially define a geographical area may be determined such that inside of the boundaries, the network performance is below desired standards, and such that outside of the boundaries, the network performance meets or exceeds desired standards.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A computer-implemented method for managing autonomous vehicles, the method comprising:
    maintaining a navigation map of a geographic region, the map data (i) being maintained for operating a fleet of autonomous vehicles within the geographic region and (ii) including a map layer that indicates a set of routing rules for determining routes for the fleet of autonomous vehicles within the geographic region;
    maintaining a teleoperations coverage map for the geographic region;
    receiving, from a first vehicle, a first set of network performance data that (i) is generated by the first vehicle while the first vehicle operates within the geographic region and (ii) includes one or more network performance metrics for a first area within the geographic region;
    updating the teleoperations coverage map based on the first set of network performance data, wherein the updated teleoperations coverage map indicates the first area as being associated with low performance for teleoperations;
    updating the map layer based on the updated teleoperations coverage map, wherein updating the map layer based on the updated teleoperations coverage map includes updating or generating a routing rule associated with the first area; and
    determining, based on the navigation map, a route for an autonomous vehicle, the route being determined in accordance with the routing rule associated with the first area.

2. The method of claim 1, wherein the one or more network performance metrics of the first set of network performance data comprises one or more of a latency, a bandwidth, or a round trip time associated with the first area within the geographic region.

3. The method of claim 1, wherein the first vehicle is equipped with a plurality of modems for establishing a plurality of wireless data links.

4. The method of claim 3, wherein the one or more network performance metrics are metrics indicative of an overall performance of the plurality of wireless data links established by the plurality of modems onboard the first vehicle while the first vehicle is within the first area.

5. The method of claim 1, wherein the routing rules associated with the first area includes a routing constraint prohibiting generation of routes into or through the first area or a routing cost function.

6. The method of claim 1, wherein the routing rules associated with the first area is associated with an expiration time.

7. The method of claim 1, wherein the teleoperations coverage map is updated based further on teleoperations performance data.

8. The method of claim 7, wherein the teleoperations performance data is received from a teleoperations computing system.

9. The method of claim 7, wherein the teleoperations performance data indicates a disconnection rate of active teleoperations sessions.

10. The method of claim 1, where updating the teleoperations coverage map based on the first set of network performance data comprises determining confidence levels of acceptable teleoperations performance within the first area based on the first set of network performance data.

11. The method of claim 1, further comprising generating a visualization of the teleoperation coverage map.

12. A computing system for managing autonomous vehicles, the computing system comprising:
one or more processors; and
one or more memory resources storing instructions that, when executed by the one or more processors of the computing system, cause the computing system to:
maintain a navigation map of a geographic region, the map data (i) being maintained for operating a fleet of autonomous vehicles within the geographic region and (ii) including a map layer that indicates a set of routing rules for determining routes for the fleet of autonomous vehicles within the geographic region;
maintain a teleoperations coverage map for the geographic region;
receive, from a first vehicle, a first set of network performance data that (i) is generated by the first vehicle while the first vehicle operates within the geographic region and (ii) includes one or more network performance metrics for a first area within the geographic region;
update the teleoperations coverage map based on the first set of network performance data, wherein the updated teleoperations coverage map indicates the first area as being associated with low performance for teleoperations;
update the map layer based on the updated teleoperations coverage map, wherein updating the map layer based on the updated teleoperations coverage map includes updating or generating a routing rule associated with the first area; and
determine, based on the navigation map, a route for an autonomous vehicle, the route being determined in accordance with the routing rule associated with the first area.

13. The computing system of claim 12, wherein the one or more network performance metrics of the first set of network performance data comprises one or more of a latency, a bandwidth, or a round trip time associated with the first area within the geographic region.

14. The computing system of claim 12, the first vehicle is equipped with a plurality of modems for establishing a plurality of wireless data links; and
wherein the one or more network performance metrics are metrics indicative of an overall performance of the plurality of wireless data links established by the plurality of modems onboard the first vehicle while the first vehicle is within the first area.

15. The computing system of claim 12, wherein the routing rules associated with the first area includes a routing constraint prohibiting generation of routes into or through the first area or a routing cost function.

16. The computing system of claim 12, wherein the routing rules associated with the first area is associated with an expiration time.

17. The computing system of claim 12, wherein the teleoperations coverage map is updated based further on teleoperations performance data received from a teleoperations computing system; and
wherein the teleoperations performance data indicates a disconnection rate of active teleoperations sessions.

18. The computing system of claim 12, where updating the teleoperations coverage map based on the first set of network performance data comprises determining confidence levels of acceptable teleoperations performance within the first area based on the first set of network performance data.

19. A non-transitory computer-readable medium storing instructions that, when executed by one or more processors of a computing system for managing autonomous vehicles, cause the computing system to:
maintain a navigation map of a geographic region, the map data (i) being maintained for operating a fleet of autonomous vehicles within the geographic region and (ii) including a map layer that indicates a set of routing rules for determining routes for the fleet of autonomous vehicles within the geographic region;
maintain a teleoperations coverage map for the geographic region;
receive, from a first vehicle, a first set of network performance data that (i) is generated by the first vehicle while the first vehicle operates within the geographic region and (ii) includes one or more network performance metrics for a first area within the geographic region;
update the teleoperations coverage map based on the first set of network performance data, wherein the updated teleoperations coverage map indicates the first area as being associated with low performance for teleoperations;
update the map layer based on the updated teleoperations coverage map, wherein updating the map layer based on the updated teleoperations coverage map includes updating or generating a routing rule associated with the first area; and
determine, based on the navigation map, a route for an autonomous vehicle, the route being determined in accordance with the routing rule associated with the first area.

20. The non-transitory computer-readable medium of claim 19, wherein the one or more network performance metrics of the first set of network performance data comprises one or more of a latency, a bandwidth, or a round trip time associated with the first area within the geographic region.

* * * * *